US011092859B2

(12) United States Patent
Chang et al.

(10) Patent No.: US 11,092,859 B2
(45) Date of Patent: Aug. 17, 2021

(54) DISPLAY PANEL WITH NON-RECTANGULAR DISPLAY REGION

(71) Applicant: HANNSTAR DISPLAY CORPORATION, Taipei (TW)

(72) Inventors: Chung-Lin Chang, Kaohsiung (TW); Hsien-Tang Hu, Taichung (TW); Kun-Tsai Huang, Kaohsiung (TW)

(73) Assignee: HANNSTAR DISPLAY CORPORATION, Taipei (TW)

( * ) Notice: Subject to any disclaimer, the term of this patent is extended or adjusted under 35 U.S.C. 154(b) by 0 days.

(21) Appl. No.: 16/869,566

(22) Filed: May 7, 2020

(65) Prior Publication Data
US 2020/0365102 A1    Nov. 19, 2020

(30) Foreign Application Priority Data

May 13, 2019   (CN) .......................... 201910394906.9

(51) Int. Cl.
    *G02F 1/1343*    (2006.01)
    *G02F 1/1335*    (2006.01)
    *G02F 1/1362*    (2006.01)
    *G09G 3/36*      (2006.01)

(52) U.S. Cl.
    CPC .. *G02F 1/134309* (2013.01); *G02F 1/133514* (2013.01); *G02F 1/136209* (2013.01); *G02F 1/133512* (2013.01); *G02F 2201/121* (2013.01); *G02F 2201/123* (2013.01); *G02F 2201/52* (2013.01); *G09G 3/3625* (2013.01); *G09G 2300/0452* (2013.01)

(58) Field of Classification Search
    CPC ............... G09G 3/3625; G09G 3/3648; G02F 1/134309; G02F 1/134363; G02F 1/134372; G02F 1/1368; G02F 1/13439; G02F 1/133514; G02F 1/133512; G02F 2201/123; G02F 2201/121; G02F 2201/122; G02F 1/136209
    See application file for complete search history.

(56) References Cited

U.S. PATENT DOCUMENTS

| 2009/0309813 | A1  | 12/2009 | Fujita   |              |
|--------------|-----|---------|----------|--------------|
| 2016/0120005 | A1* | 4/2016  | Wu       | H05B 33/26   |
|              |     |         |          | 313/505      |
| 2019/0212619 | A1* | 7/2019  | Kanehiro | G02F 1/1337  |
| 2020/0064682 | A1* | 2/2020  | Ishikawa | G02F 1/133512|

* cited by examiner

*Primary Examiner* — Xuemei Zheng
(74) *Attorney, Agent, or Firm* — Winston Hsu

(57) ABSTRACT

The present invention provides a display panel, the display panel includes at least one first inner sub-pixel disposed in a display region of the display panel and a plurality of first compensation sub-pixels disposed between an end of the first sub-pixel column and the first inner sub-pixel, and a shape of the display region is non-rectangular. Each of the first inner sub-pixel and the first compensation sub-pixels includes a sub-pixel unit, a light shielding sub-block and a color filter block, structures of the sub-pixel units of the first compensation sub-pixels are different from a structure of the sub-pixel unit of the first inner sub-pixel, and the structures of the sub-pixel units of the first compensation sub-pixels are different from each other.

12 Claims, 10 Drawing Sheets

DISPLAY PANEL WITH NON-RECTANGULAR DISPLAY REGION

BACKGROUND OF THE INVENTION

1. Field of the Invention

The present invention relates to a display panel, and more particularly, to a display panel with non-rectangular display region.

2. Description of the Prior Art

Because of its lightweight appearance, low power consumption and radiation-free contamination, the display panel has been widely used in various portable or wearable electronic products such as notebooks, smart phones and watches, as well as vehicle displays, to provide more convenient information transmission and display. In recent technology, the display panel is also developed into various shapes different from the rectangular shape, such as circle and polygons, so that the design and application of the display panel are more flexible. However, due to the non-rectangular design, sub-pixels in one pixel that overlap the non-rectangular edge will have inconsistent light transmitting areas, so when the sub-pixels are driven with the same grey level, the brightness of the generated light with different colors are inconsistent, thereby generating unwanted color and obvious color shift and reducing display quality of the display panel. Although pixels with obvious color shift may be covered with black matrix recently to avoid being seen by user, the user easily still sees zigzag edge of the non-rectangular edge in this approach. Therefore, improvement of the display quality of non-rectangular display panels is an urgent subject for technicians in the related field.

SUMMARY OF THE INVENTION

It is therefore an objective of the present invention to solve the above-mentioned technical problem by providing a display panel with a non-rectangular display region to improve the display quality of the display panel at the edge of the display region.

To solve the above technical problem, the present invention provides a display panel, the display panel includes at least one first inner sub-pixel disposed in a display region of the display panel and a plurality of first compensation sub-pixels disposed between an end of the first sub-pixel column and the first inner sub-pixel, and a shape of the display region is non-rectangular. Each of the first inner sub-pixel and the first compensation sub-pixels includes a sub-pixel unit, a light shielding sub-block and a color filter block, structures of the sub-pixel units of the first compensation sub-pixels are different from a structure of the sub-pixel unit of the first inner sub-pixel, and the structures of the sub-pixel units of the first compensation sub-pixels are different from each other.

In summary, in the display panel of the present invention, by means of the difference in the areas of the first electrodes, the difference in the widths of the slits, the difference in the areas of the pixel electrode of the sub-pixel units, the transmittances of the compensation sub-pixel units in different sub-pixel columns closest to the corresponding end may be adjusted to be different from each other, or the transmittances of the compensation sub-pixel units in the same sub-pixel column may be sequentially reduced along the direction from the inner sub-pixel to an end of the sub-pixel column. Accordingly, the brightness of light generated by the sub-pixel corresponding to the compensation sub-pixel unit may be reduced, thereby mitigating the zigzag appearance at the edge of the non-rectangular panel, and the display quality of the display panel may be improved.

These and other objectives of the present invention will no doubt become obvious to those of ordinary skill in the art after reading the following detailed description of the preferred embodiment that is illustrated in the various figures and drawings.

DETAILED DESCRIPTION

In order to enable those skilled in the art to further understand the present invention, preferred embodiments of the present invention are listed below, and the composition and intended effects of the present invention will be described in detail with reference to the accompanying drawings. It should be noted that the drawings are simplified schematic diagrams, therefore, only the components and combination relationships related to the present invention are shown to provide a clearer description of the basic architecture or implementation method of the present invention, while the actual components and layout may be more complicated. In addition, for convenience of explanation, the elements shown in the various drawings of the present invention are not drawn to the actual number, shape and size, and the detailed scale can be adjusted according to the design requirements.

Figure 1:
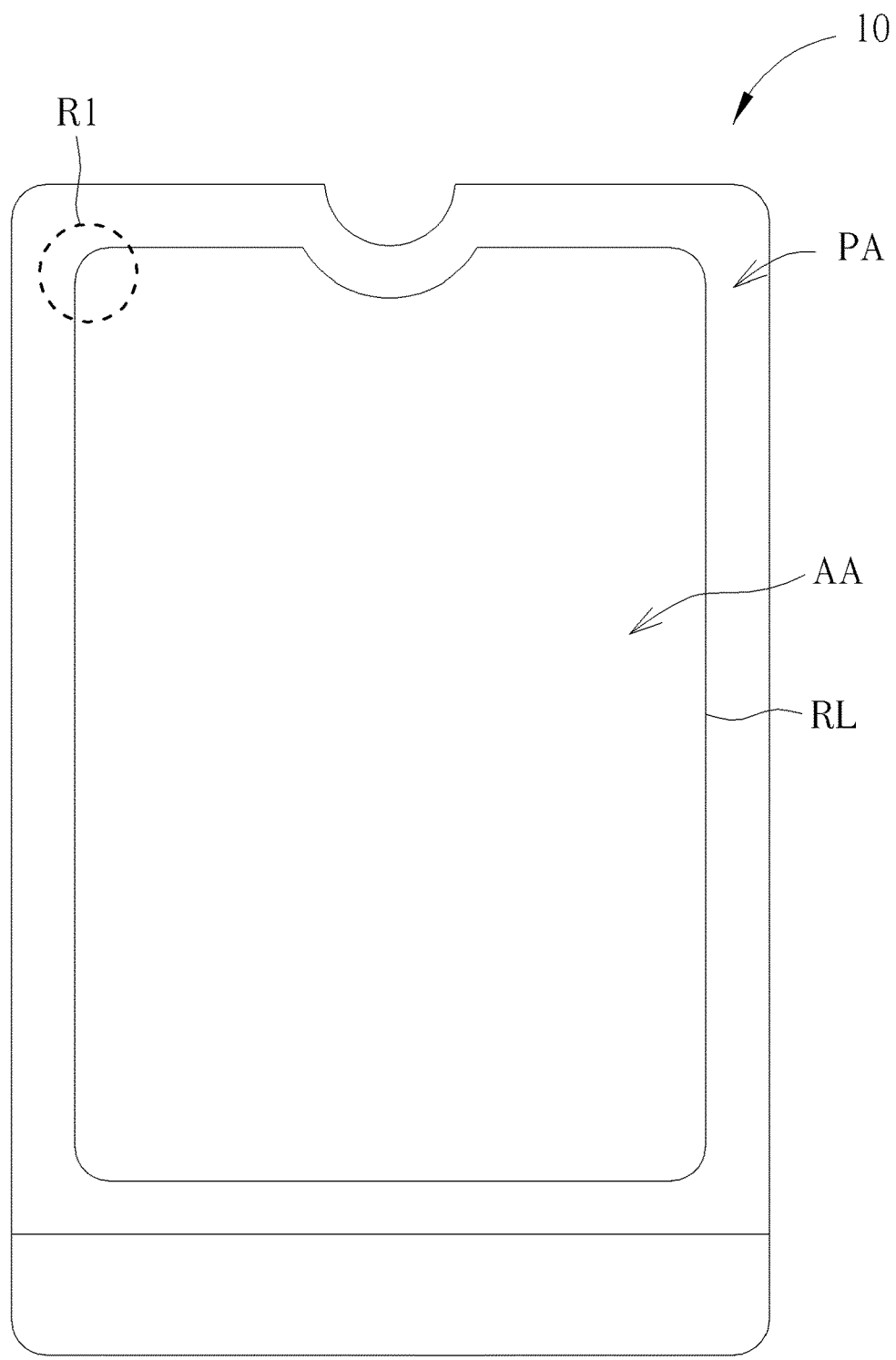
FIG. 1 schematically illustrates a top view of a display panel according to an embodiment of the present invention.

FIG. 1 schematically illustrates a top view of a display panel according to an embodiment of the present invention. As shown in FIG. 1, the display panel 10 includes a display region AA and a peripheral region PA disposed at at least one side of the display region AA. In the present invention, the display region AA is a non-rectangular display region. In this embodiment, peripheral region PA surrounds display region AA, but not limited thereto. A reference line RL in FIG. 1 may represent an edge of the display region AA. For example, a shape of the display region AA may be non-rectangular because of non-rectangular outline of the display panel 10, or because of the requirement for increasing the area of the display region AA and disposing device (such as camera device and/or biometric feature identification device) in at least one area outside the display region AA, but not limited thereto. In this embodiment, the display region AA may have a rounded edge at its corner, such as the edge in a region R1, or a side of the display region AA may also have curved edge, such as a top side of the display region AA may have the concave edge. Furthermore, the display region AA may also have a straight edge (i.e. straight part of the reference line RL), but not limited thereto. The rounded edge of the display region AA may also be adjusted according to actual requirements. It is noted that, the reference line RL may be for example an outline of the display region AA provided by designer during a stage of designing the display panel 10 or the outline of the display region AA perceived by user while using the display panel.

Figure 2:
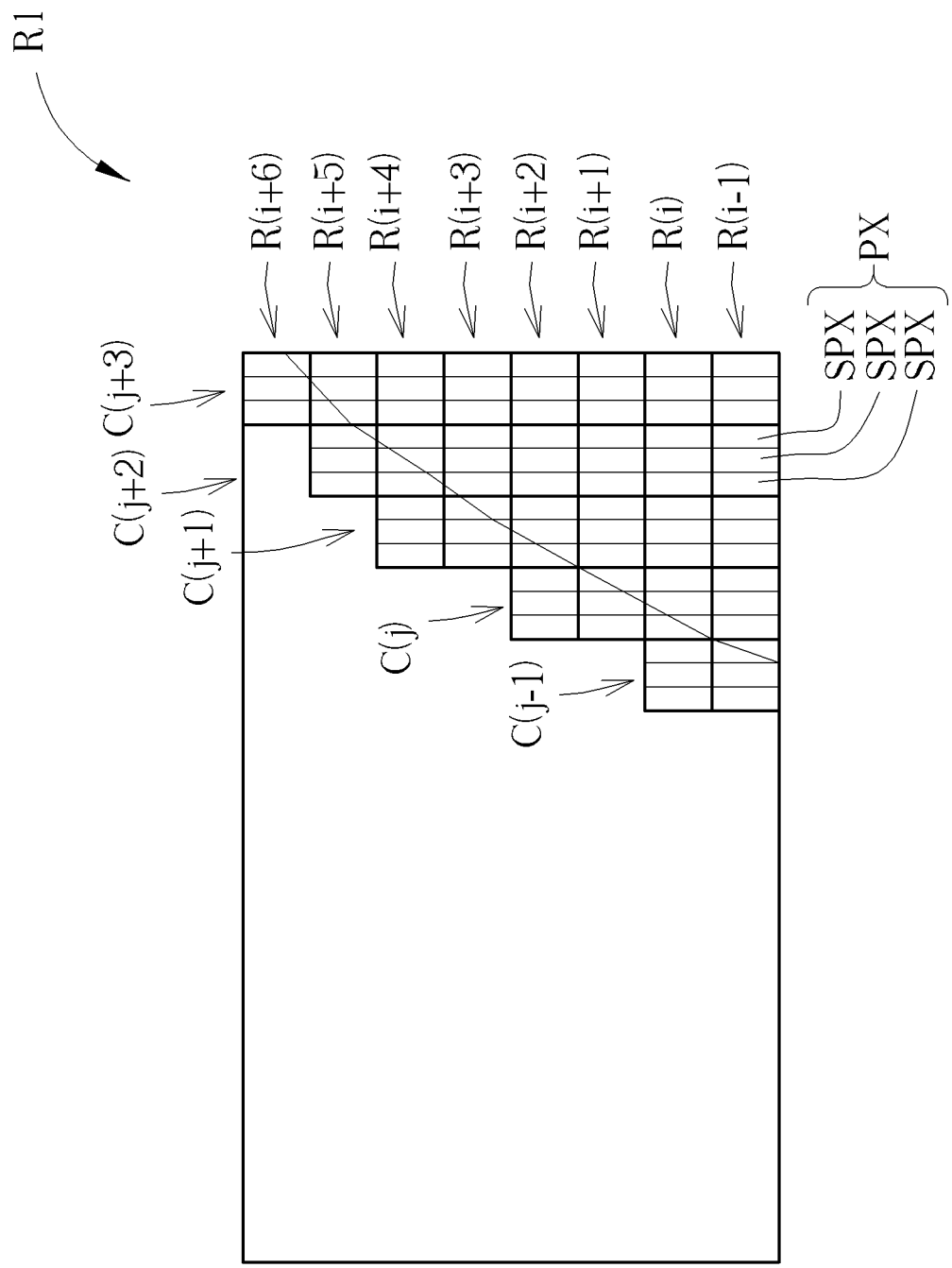
FIG. 2 schematically illustrates an enlarged view of the region R1 shown in FIG. 1.
Figure 3:
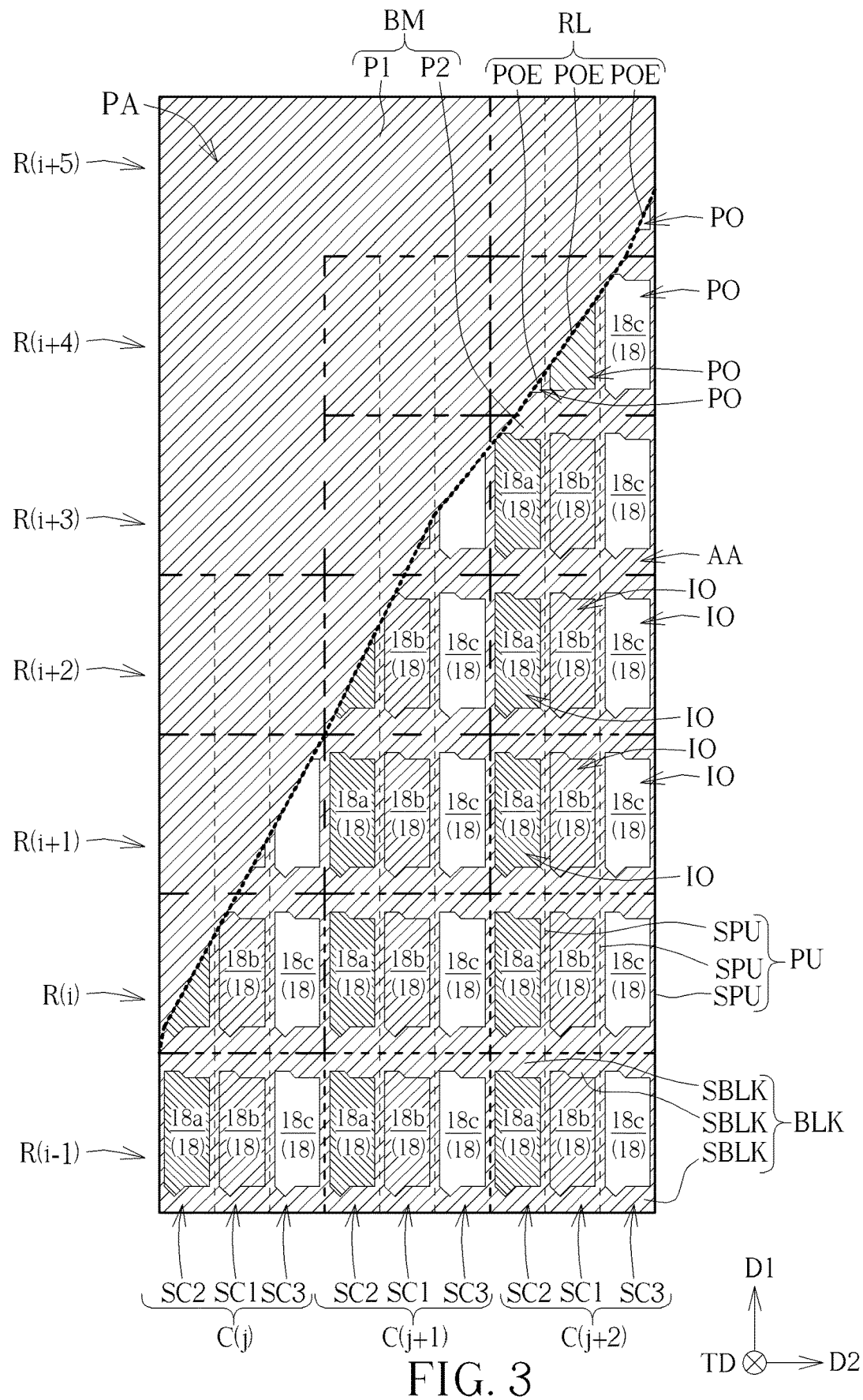
FIG. 3 and FIG. 4 schematically illustrate pixels corresponding to pixel rows $R(i-1)$-$R(i+5)$ and pixel columns $C(j)$-$C(j+2)$ shown in FIG. 2.
Figure 4:
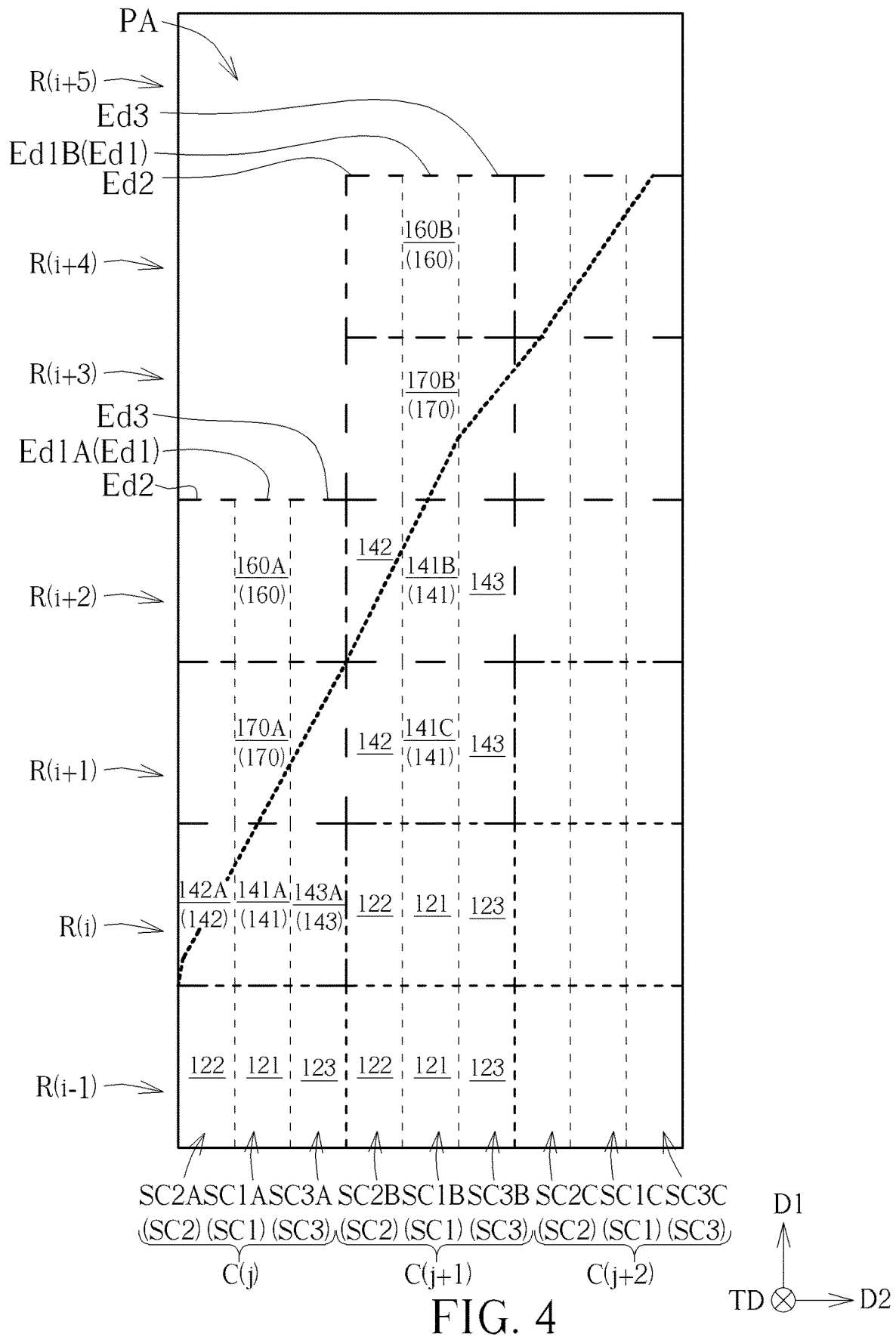

A structure of the display panel 10 at the curved edge of the display region AA is further detailed in the following description. Please refer to FIG. 2, FIG. 3 and FIG. 4, FIG. 2 schematically illustrates an enlarged view of the region R1 shown in FIG. 1, FIG. 3 and FIG. 4 schematically illustrate pixels of pixel rows R(i−1)-R(i+5) and pixel columns C(j)-C(j+2) shown in FIG. 2. For purposes of brevity and ease of explanation, a portion of the symbols in FIG. 4 is not shown in FIG. 3, and FIG. 4 does not illustrate light shielding layer BM and color filter block 18 of FIG. 3. The structure in the region R1 of FIG. 2 is as an example in the following description, but not limited thereto. As shown in FIG. 2 and FIG. 3, the display panel 10 may include a plurality of pixels PX, each pixel PX include a pixel unit PU and a light shielding block BLK, and at least a part of the pixel unit PU overlaps a corresponding light shielding block BLK. As used herein, "overlap" may be defined as overlap in a top view direction TD of the display panel 10. In an embodiment that each pixel PX includes a plurality of sub-pixels SPX and the plurality of sub-pixels SPX respectively display different colors, each sub-pixel SPX includes a sub-pixel unit SPU, a light shielding sub-block SBLK and a color filter block 18. It is worthy to note that, in this embodiment and the following description, each pixel PX is composed of three sub-pixels SPX, but the number of the sub-pixels SPX in one pixel PX of the present invention is not limited thereto. For example, in other embodiments, one pixel may be composed of four sub-pixels, but not limited thereto. The sub-pixel unit SPU includes devices for controlling grey scale of the sub-pixel, for example, in the embodiment that the display panel 10 is a liquid crystal display panel, the sub-pixel unit SPU may include a thin film transistor, a pixel electrode, a common electrode and a liquid crystal layer, but not limited thereto. The light shielding sub-block SBLK is a part of the light shielding block BLK, and at least a part of the sub-pixel unit SPU overlaps a corresponding color filter block 18. As shown in FIG. 3, the light shielding block BLK is a part of the light shielding layer BM, the light shielding layer BM may be used for shielding the peripheral region PA and defining boundary between the display region AA and the peripheral region PA, and the light shielding layer BM may further shield light leakage region of each pixel unit PU in the display region AA. In this embodiment, the light shielding block BLK of the pixel PX is a part of the light shielding layer BM disposed in the region of the pixel PX, but not limited thereto. For example, a part of the light shielding layer BM is disposed in the display region AA and has a plurality of openings that allows light penetrating through and defines the display area of the sub-pixel SPX, but not limited thereto. In other words, the light shielding layer BM may include a first part P1 and a second part P2, in which the first part P1 is disposed in the peripheral region PA, and the second part P2 is disposed in the display region AA, but not limited thereto. In some embodiments, a light shielding layer is disposed in peripheral region PA, and another light shielding layer is disposed in the display region AA, or no light shielding layer is disposed in display region AA. In this embodiment, the light shielding block BLK is a part of the light shielding layer BM, but not limited thereto.

The openings of the light shielding layer BM may include a plurality of inner openings IO each surrounded by a portion of the second part P2 and a plurality of peripheral openings PO each surrounded by a portion of the first part P1 and a portion of the second part P2. The reference line RL regarded as the boundary between the display region AA and the peripheral region PA may be formed, for example, by connecting outward edges of the outmost peripheral openings PO. For example, the peripheral opening PO may have an oblique edge corresponding to a part of the reference line RL, and at least a portion of the outer edge of the display region AA can be formed by connecting the oblique edges POE, but not limited thereto. The pixel PX has four sides (top, bottom, left, right sides), and the oblique edge POE is not parallel to the sides of the pixel PX. The oblique edge POE may be a straight line or a curved line, but not limited thereto. In other words, in the present invention, the light shielding layer BM in the display panel 10 has a plurality of peripheral openings PO, the outward edge of each peripheral opening PO is identical or similar to a part of the reference line RL, so at least some peripheral openings PO of the plurality of peripheral openings PO have the oblique edges POE that are not parallel to the sides of the pixels PX, and each oblique edge POE may be a straight line or a curved line and identical or similar to a part of the reference line RL, such that the outer edge of the display region AA of the display panel 10 can be the same as or similar to the reference line RL (predetermined outline of the display region AA) provided by a designer during design stage. Because of the curved reference line RL, the size of the peripheral opening PO having the oblique edge POE is less than the size of the inner opening IO. For example, the inner openings IO may have identical size, and each peripheral opening PO has a respective size according to parts of sub-pixels crossed by the reference line RL. In some embodiments, the second part P2 may have a mesh shape, but not limited thereto. The shapes of the inner openings IO and the shapes of the peripheral openings PO of the present invention are not limited thereto. In some embodiments, the light shielding layer BM may be so-called black matrix layer, which includes light-shielding material, such as black resin or black photoresist material, but not limited thereto.

The pixel PX may be fully disposed in display region AA, may be disposed in display region AA and peripheral region PA at the same time, or may be fully disposed in peripheral region PA. In FIG. 3, since the region of the pixel PX and the region of the pixel unit PU are identical, only the pixel units PU are illustrated, but not limited thereto. The pixels PX may be arranged for example into a plurality of pixel rows or a plurality of pixel columns, but not limited thereto. Since the non-rectangular display region AA has the edge not parallel to the sides of the pixels PX (such as the curved edge in the region R1 shown in FIG. 1), at least a part of the edge of the display region AA crosses at least a part of pixels PX of the pixel row or the pixel column. For example, as shown in FIG. 2 and FIG. 3, the pixel PX located at the crossing of the pixel column C(j+1) and the pixel row R(i+2) crosses a part of the edge of the display region AA, such that a part and another part of the pixel PX are disposed in the display region AA and the peripheral region PA, respectively. In addition, the numbers of the pixels PX respectively in two adjacent pixel rows or two adjacent pixel columns may be identical or different. In one embodiment, an extending direction of the pixel column and an extending direction of the pixel row may be a first direction D1 and a second direction D2, respectively, but not limited thereto. In some embodiments, the arrangement of the pixels PX is not limited to the arrangement shown in FIG. 2, and may be adjusted according to actual requirement, such as adjacent pixel rows or adjacent pixel columns may be arranged in a staggered form. In some embodiments, the oblique edge of each peripheral opening PO may not be parallel to the first direction D1 and the second direction D2. As shown in FIG. 2, at least a part of the pixel columns (such as C(j−1)-C(j+3)) may cross the curved edge of the display region AA (i.e. curved part of the reference line RL). In some embodiments, when the display region AA has a straight edge (i.e. straight part of the reference line RL) parallel to at least a side of the pixel PX, the straight edge may be aligned to at least a side of the pixel PX, i.e. the straight edge does not cross the pixel PX.

As shown in FIG. 3, each pixel unit PU is composed of three sub-pixel units SPU, each light shielding block BLK has three light shielding sub-blocks SBLK respectively corresponding to and partially overlapping the regions of three sub-pixel units SPU of the pixel unit PU. Each light shielding sub-block SBLK may have the inner opening IO or the peripheral opening PO. The shape of the light shielding sub-block SBLK in the present invention is not limited thereto. For example, a top-view shape of the light shielding sub-block SBLK may be a frame-shaped pattern with one inner opening IO or one peripheral opening PO, but not limited thereto. In some embodiments, the top-view shape of the light shielding sub-block SBLK may be a non-frame-shaped pattern with one opening, or the light shielding sub-block SBLK includes a plurality of light shielding blocks which are not connected to each other.

The display panel 10 may further include a plurality of color filter blocks 18, each of the color filter blocks 18 overlaps a corresponding inner opening IO or a corresponding peripheral opening PO of the light shielding layer BM, such that each sub-pixel SPX may display a corresponding color. For example, in the embodiment that each pixel PX includes three sub-pixels SPX, each pixel PX includes one pixel unit PU, one light shielding block BLK and three color filter blocks 18, and each sub-pixel SPX includes one sub-pixel unit SPU, one light shielding sub-block SBLK and one color filter block 18. For example, the color filter block 18 may include a first color filter block 18b, a second color filter block 18a and a third color filter block 18c, which have a first color, a second color and a third color, respectively, and the first to the third colors can be mixed into white color, but not limited thereto. The first color filter block 18b, the second color filter block 18a and the third color filter block 18c may respectively correspond to the sub-pixel units SPU of the sub-pixels SPX of the pixel PX for displaying different colors, and the first to third color filter blocks 18b, 18a, 18c may be a green color filter block, a red color filter block and a blue color filter block, respectively, but not limited thereto. In some embodiments, the first color filter blocks 18b may be formed of a same first color filter layer, the second color filter blocks 18a may be formed of a same second color filter layer, and the third color filter blocks 18c may be formed of a same third color filter layer. The number of the sub-pixels SPX in one pixel PX of the present invention is not limited thereto.

In this embodiment, a plurality of pixels PX are arranged into a plurality of pixel columns (such as the pixel columns C(j)-C(j+2) in FIG. 3) and a plurality of pixel rows (such as the pixel rows R(i−1)-R(i+5) in FIG. 3). Each pixel column may include at least three sub-pixel columns, such as the sub-pixel column SC1 corresponding to the first color, the sub-pixel column SC2 corresponding to the second color, and the sub-pixel column SC3 corresponding to the third color. The first color, the second color and the third color may be mixed into white color, but not limited thereto. For example, the first color, the second color and the third color may be green, red and blue, respectively, and the sub-pixel columns SC2, SC1, SC3 respectively corresponding to the second color, the first color and the third color may be arranged alternately along the second direction D2, but not limited thereto. The colors and the arrangement of the sub-pixel columns SC1, SC2, SC3 of the present invention may be adjusted according to the design requirement. It is worthy to note that since three sub-pixels SPX corresponding to different colors are arranged along the second direction D2 to form one pixel PX in this embodiment, the pixel rows (such as the pixel rows R(i−1)-R(i+5) in FIG. 3) may also be called sub-pixel rows in this embodiment.

As shown in FIG. 3 and FIG. 4, the leftmost sub-pixel SPX and the middle sub-pixel SPX of the pixel PX located at the crossing of the pixel column C(j) and the pixel row R(i) cross the edge of the display region AA, and the areas of the openings of the light shielding sub-blocks SBLK of which are respectively less than the areas of the openings of the light shielding sub-blocks SBLK of the leftmost sub-pixel SPX and the middle sub-pixel SPX of the pixel PX fully located in the display region AA (such as the pixel PX located at the crossing of the pixel column C(j+1) and the pixel row R(i)), so the color of the pixel mixed by the colors of the sub-pixels SPX of the pixel PX located at the crossing of the pixel column C(j) and the pixel row R(i) is different from expectation, resulting in the zigzag appearance at the edge of the non-rectangular display region AA when the user sees the display panel 10. The description mentioned above takes the pixel PX at the crossing of the pixel column C(j) and the pixel row R(i) for an example, but not limited thereto. Therefore, the structures of the sub-pixel units SPU located at or near the edge of the non-rectangular display region AA may be adjusted in the present invention to reduce the brightness of light generated by the sub-pixels SPX located at or near the edge of the non-rectangular display region AA, so as to mitigate the zigzag appearance at the edge of the non-rectangular display region AA and further improve the display quality of the display panel 10. In detail, the sub-pixel columns crossing the edge of the display region AA may include at least one inner sub-pixel and at least one compensation sub-pixel, in which the inner sub-pixel is fully disposed in the display region AA and does not overlap the peripheral region PA, and the compensation sub-pixel is disposed between an end of the pixel column and the inner sub-pixel and crosses the edge of the display region AA, or the compensation sub-pixel is located near the edge of the display region AA and does not cross the edge of the display region AA. In the present invention, the structure of sub-pixel unit SPU of the compensation sub-pixel is different from the structure of the sub-pixel unit SPU of the inner sub-pixel, such that transmittance of the sub-pixel unit SPU of the compensation sub-pixel is less than transmittance of the sub-pixel unit SPU of the inner sub-pixel. Accordingly, transmittance of the compensation sub-pixel is less than transmittance of the inner sub-pixel, thereby reducing the brightness of the sub-pixels located at or near the edge of the non-rectangular display region AA and mitigating the zigzag appearance at the edge of the non-rectangular display region AA. Specifically, the sub-pixel column SC1 corresponding to the first color is as an example, the sub-pixel column SC1 crossing the edge of the display region AA may include at least one inner sub-pixel 121 and at least one compensation sub-pixel 141, in which the inner sub-pixel 121 is disposed in the display region AA, and the compensation sub-pixel 141 is disposed between a first end Ed1 and the inner sub-pixel 121 of the sub-pixel column SC1. The structure of the sub-pixel unit SPU of the compensation sub-pixel 141 is different from the structure of the sub-pixel unit SPU of the inner sub-pixel 121, such that the transmittance of the compensation sub-pixel 141 is less than the transmittance of the inner sub-pixel 121. For example, the sub-pixel column SC1A has a first end Ed1A and a second end (not shown) opposite to each other, the sub-pixel column SC1B has a first end Ed1B and a second end (not shown) opposite to each other, and the compensation sub-pixels 141A, 141B are respectively disposed between the first end Ed1A and the inner sub-pixel 121 of the sub-pixel column SC1A and between the first end Ed1B and the inner sub-pixel 121 of the sub-pixel column SC1B. Each of the structures of the sub-pixel units SPU of the compensation sub-pixels 141A, 141B is different from the structure of the sub-pixel unit SPU of the inner sub-pixel 121, such that each of the transmittances of the sub-pixel units SPU of the compensation sub-pixels 141A, 141B is less than transmittance of the sub-pixel unit SPU of the inner sub-pixel 121, thereby reduce the transmittances of the compensation sub-pixels 141A, 141B to be less than the transmittance of the inner sub-pixel 121. Furthermore, as shown in FIG. 4, because the sub-pixel columns SC1A, SC1B are two adjacent sub-pixel columns of the plurality of sub-pixel columns corresponding to the first color, and the compensation sub-pixels 141A in the sub-pixel column SC1A and the compensation sub-pixels 141B in the sub-pixel column SC1B are respectively located in the sub-pixel row R(i) and the sub-pixel row R(i+2), i.e. the compensation sub-pixels 141A, 141B are spaced apart by a height of one sub-pixel in the first direction D1, therefore, in addition to disposing the compensation sub-pixels 141A, 141B in the sub-pixel columns SC1A, SC1B corresponding to the first color, respectively, the compensation sub-pixel 141C is disposed in the sub-pixel column SC1B and located at the crossing of the sub-pixel column SC1B and the sub-pixel row R(i+1) in the present invention. That is, in two adjacent sub-pixel columns SC1A, SC1B corresponding to the first color, the sub-pixel column SC1A includes the compensation sub-pixel 141A located in the pixel row R(i), and the sub-pixel column SC1B includes the compensation sub-pixels 141C, 141B respectively located in the pixel row R(i+1), R(i+2), so as to avoid zigzag appearance at the edge of the display region AA resulted from the compensation sub-pixel 141A, 141B spaced apart by a height of one sub-pixel in the first direction D1. The structure of the sub-pixel unit SPU of the compensation sub-pixel 141C is different from the structure of the sub-pixel unit SPU of the compensation sub-pixel 141B and the structure of the sub-pixel unit SPU of the inner sub-pixel 121, such that the transmittance of the sub-pixel unit SPU of the compensation sub-pixel 141C is greater than the transmittance of the sub-pixel unit SPU of the compensation sub-pixel 141B, and the transmittance of the sub-pixel unit SPU of the compensation sub-pixel 141C is less than the transmittance of the sub-pixel unit SPU of the inner sub-pixel 121, i.e. the transmittances of the sub-pixel units SPU of two compensation sub-pixels 141C, 141B in the sub-pixel column SC1B are sequentially decreased along a direction from the inner sub-pixel 121 toward the first end Ed2B (that is the first direction D1 in this embodiment), so as to sequentially reduce the transmittances of the compensation sub-pixel 141C, 141B along the direction from the inner sub-pixel 121 toward the first end Ed1B. Accordingly, the brightness of light generated by the sub-pixels located at or close to the edge of the non-rectangular display region AA is reduced, and the zigzag appearance at the edge of the non-rectangular display region AA may be mitigated. It is worthy to note that, the compensation sub-pixel 141B located in the sub-pixel column SC1B crosses the edge of the non-rectangular display region AA, and the compensation sub-pixel 141C is fully located in the display region AA and does not cross the edge of the non-rectangular display region AA. The compensation sub-pixels 141A, 141B in the two adjacent sub-pixel column SC1A, SC1B corresponding to the first color, which are spaced apart by the height of one sub-pixel, are as an example in the above-mentioned description, but not limited thereto.

As mentioned above, the display panel 10 includes a first sub-pixel column and a second sub-pixel column, and the first sub-pixel column and the second sub-pixel column are two adjacent sub-pixel columns of the plurality of sub-pixel columns corresponding to the same color. The first sub-pixel column includes a first compensation sub-pixel disposed between the first end and the inner sub-pixel of the first sub-pixel column, and the first compensation sub-pixel is the compensation sub-pixel closest to the first end. The second sub-pixel column includes a second compensation sub-pixel disposed between the first end and the inner sub-pixel of the second sub-pixel column, and the second compensation sub-pixel is the compensation sub-pixel closest to the first end of the second sub-pixel column. The first compensation sub-pixel and the second compensation sub-pixel are respectively located in the $m^{th}$ sub-pixel row and the $n^{th}$ sub-pixel row. When the $m^{th}$ sub-pixel row and the $n^{th}$ sub-pixel row are not adjacent to each other, and there is k number of sub-pixel row(s) between the $m^{th}$ sub-pixel row and the $n^{th}$ sub-pixel row, the second sub-pixel column may further include k number of third compensation sub-pixel(s) disposed between the second compensation sub-pixel and the inner sub-pixels of the second sub-pixel column, where k is a positive integer greater than or equal to 1, the structures of the sub-pixel units of the plurality of compensation sub-pixels located between the first end and the inner sub-pixel of the second sub-pixel column (i.e., the sub-pixel unit of the second compensation sub-pixel and the sub-pixel unit of the k number third compensation sub-pixel(s)) are different from each other, and the transmittances of the sub-pixel units of the plurality of compensation sub-pixels are sequentially decreased along a direction from the inner sub-pixel toward the first end (that is, sequentially decreased along the first direction D1 in this embodiment), so that the transmittances of the plurality of compensation sub-pixels located between the first end and the inner sub-pixel of the second sub-pixel column are sequentially decreased along the direction from the inner sub-pixel toward the first end. Therefore, in two adjacent sub-pixel columns of the plurality of sub-pixel columns corresponding to the same color, the number of compensation sub-pixel(s) located between the first end and the inner sub-pixel of one of the two adjacent sub-pixel columns may be the same as or different from the number of compensation sub-pixel(s) located between the first end and the inner sub-pixel of the other of the two adjacent sub-pixel columns. For example, the first and second sub-pixel columns may be sub-pixel columns SC1A, SC1B in FIG. 4, respectively, and the first to third compensation sub-pixels may be compensation sub-pixels 141A, 141B, 141C in FIG. 4, respectively, but not limited thereto. In the above description, a portion of the edge of the display region AA crosses at least one sub-pixel near the first end of the sub-pixel column, and at least one compensation sub-pixel is disposed between the first end and the inner sub-pixel of the sub-pixel column, but not limited thereto. In the embodiment where another portion of the edge of the display region AA crosses at least one sub-pixel near the second end of the sub-pixel column, another at least one compensation sub-pixel may be disposed between the second end and the inner sub-pixel of the sub-pixel column, and the arrangement may be similar to the above description and will not be repeated herein. In addition, in FIG. 4, the arrangement of the compensation sub-pixels of another two adjacent sub-pixel columns corresponding to the first color (e.g., sub-pixel columns SC1B, SC1C), the arrangement of the compensation sub-pixels 142 of the two adjacent sub-pixel columns corresponding to the second color (e.g., sub-pixel columns SC2A, SC2B, or sub-pixel columns SC2B, SC2C), and the arrangement of the compensation sub-pixels 143 of the two adjacent sub-pixel columns corresponding to the third color (e.g., sub-pixel columns SC3A, SC3B, or sub-pixel columns SC3B, SC3C) may also be similar to the above description, and will not be described again.

It is worthy to note that the structures of the sub-pixel units of the compensation sub-pixels 141, 142, 143 are respectively different from the structures of the sub-pixel units of the inner sub-pixels 121, 122, 123, so that the transmittances of the sub-pixel units SPU of the compensation sub-pixels 141, 142, 143 are respectively less than the transmittances of the sub-pixel units SPU of the inner sub-pixels 121, 122, 123, and thus, the transmittances of the compensation sub-pixels 141, 142, 143 are respectively less than the transmittances of the inner sub-pixels 121, 122, 123. In this embodiment, the sub-pixel units SPU of the inner sub-pixels 121, 122, 123 may have the same structure and have the same transmittance, but not limited herein. By means of the design of differentiating the transmittances, the brightness of light generated by the pixel crossing the edge of the display region AA or close to the edge of the display region AA can be reduced, so that the color shift seen by the user can be mitigated. In other words, the compensation sub-pixels 141, 142, 143 can be used for reducing the color shift at the edge of the non-rectangular display region AA. Therefore, the zigzag appearance at the edge of the non-rectangular display region AA of the display panel 10 can be mitigated, thereby improving the display quality of the display panel 10.

Further, in the embodiment where multiple compensation sub-pixels are disposed between the first end and the inner sub-pixel of the sub-pixel column, the transmittances of the compensation sub-pixels may be adjusted according to the number of the compensation sub-pixels and the distance between the compensation sub-pixel and the first end of the sub-pixel column. When P number of compensation sub-pixel(s) is or are disposed between the first end and the inner sub-pixel of the sub-pixel column, where P is a positive integer greater than or equal to 1, the transmittance(s) of the P number of compensation sub-pixel(s) is or are less than the transmittance of the inner sub-pixel of the sub-pixel column. When P is a positive integer greater than 1, the transmittances of the P compensation sub-pixels are sequentially reduced along a direction from the inner sub-pixel to the first end of the sub-pixel column. Accordingly, the zigzag appearance at the edge of the non-rectangular display region AA of the display panel 10 may be reduced. For example, P number of compensation sub-pixels ($1^{st}$ to $P^{th}$ compensation sub-pixels) are disposed between the first end and the inner sub-pixel of the sub-pixel column, P is a positive integer greater than or equal to 2. The $1^{st}$ to $P^{th}$ compensation sub-pixels are sequentially disposed along a direction from the first end to the inner sub-pixel of the sub-pixel column. In other words, a distance between an $i^{th}$ compensation sub-pixel and the first end is less than a distance between an $(i+1)^{th}$ compensation sub-pixel and the first end, and i is a positive integer greater than or equal to 1 and smaller than or equal to (P−1). The transmittance of each compensation sub-pixel of the sub-pixel column may meet the following formula (1):

$$T_N = \frac{T \times N}{P + I}, \qquad (1)$$

wherein $T_N$ is a transmittance of the $N^{th}$ compensation sub-pixel, T is a transmittance of the inner sub-pixel, and N is a positive integer greater than or equal to 1 and less than or equal to P, and I is a stimulus value of the corresponding color of the sub-pixel column. For example, if P is equal to 1, that is, only one compensation sub-pixel is disposed between the first end and the inner sub-pixel of the sub-pixel column, N is equal to 1 and $T_N$ is a transmittance of the compensation sub-pixel. If P is a positive integer greater than or equal to 2, P number of compensation sub-pixels ($1^{st}$ to $P^{th}$ compensation sub-pixels) are disposed between the first end and the inner sub-pixel of the sub-pixel column, the $1^{st}$ to $P^{th}$ compensation sub-pixels are sequentially disposed along a direction from the first end to the inner sub-pixel of the sub-pixel column (i.e. a distance between an $i^{th}$ compensation sub-pixel and the first end is less than a distance between an $(i+1)^{th}$ compensation sub-pixel and the first end, and i is a positive integer greater than or equal to 1 and smaller than or equal to (P−1)), and $T_N$ is the transmittance of the $N^{th}$ compensation sub-pixel. For example, if two compensation sub-pixels (e.g. a first compensation sub-pixel and a second compensation sub-pixel) are disposed between the first end and the inner sub-pixel of the sub-pixel column (i.e. P is equal to 2), $T_1$ and $T_2$ are respectively the transmittances of the first compensation sub-pixel and the second compensation sub-pixel, and the distance between the first compensation sub-pixel and the first end of the sub-pixel column is less than the distance between the second compensation sub-pixel and the first end of the sub-pixel column (i.e. the first compensation sub-pixel and the second compensation sub-pixel are sequentially disposed along a direction from the first end to the inner sub-pixel of the sub-pixel column); if three compensation sub-pixels (e.g. a first compensation sub-pixel, a second compensation sub-pixel and a third compensation sub-pixel) are disposed between the first end and the inner sub-pixel of the sub-pixel column (i.e. P is equal to 3), $T_1$, $T_2$ and $T_3$ are respectively the transmittances of the first compensation sub-pixel, the second compensation sub-pixel and the third compensation sub-pixel, the distance between the first compensation sub-pixel and the first end of the sub-pixel column is less than the distance between the second compensation sub-pixel and the first end of the sub-pixel column, and the distance between the second compensation sub-pixel and the first end of the sub-pixel column is less than the distance between the third compensation sub-pixel and the first end of the sub-pixel column (i.e. the first compensation sub-pixel, the second compensation sub-pixel and the third compensation sub-pixel are sequentially disposed along a direction from the first end to the inner sub-pixel of the sub-pixel column). When P number of compensation sub-pixel(s) 141 is or are included between the first end Ed1 and the inner sub-pixel 121 of the sub-pixel column SC1, the transmittance of each compensation sub-pixel may meet the formula (1), where $T_N$ is the transmittance of the $N^{th}$ compensation sub-pixel along a direction from the first end Ed1 of the sub-pixel column SC1 to the inner sub-pixel 121 (a direction opposite to the first direction D1 in the embodiment of FIG. 4), T is the transmittance of the inner sub-pixel 121, and I is the stimulus value of the corresponding first color of the sub-pixel column SC1 (e.g. the stimulus value of green color Y). Similarly, transmittances of the compensation sub-pixels 142, 143 respectively located in the sub-pixel columns SC2, SC3 meet the formula (1), and I may be a stimulus value of a second color (e.g. the stimulus value of red color X) or a stimulus value of a third color (e.g. the stimulus value of blue color Z). Regarding green, red and blue stimulus values Y, X and Z, please see the following description for FIG. 5 in detail. As the formula (1), in the plurality of sub-pixel columns corresponding to the same color, when the number of the compensation sub-pixel(s) between the first end and the inner sub-pixel of one of two adjacent sub-pixel columns is different from the number of the compensation sub-pixel(s) between the first end and the inner sub-pixel of the other of the two adjacent sub-pixel columns, the transmittance of the compensation sub-pixel closest to the first end of one of the two adjacent sub-pixel columns is different from the transmittance of the compensation sub-pixel closest to the first end of the other of the two adjacent sub-pixel columns, so that the compensation sub-pixels are arranged in a mosaic arrangement so as to mitigate the zigzag appearance at the edge of the non-rectangular display region AA. For example, when the number of the compensation sub-pixel 141 located in the sub-pixel column SC1A and between the first end Ed1A and the inner sub-pixel 121 of the sub-pixel column SC1A (e.g. one compensation sub-pixel 141A in FIG. 4 of this embodiment) is less than the number of the compensation sub-pixels 141 located in the sub-pixel column SC1B and between the first end Ed1B and the inner sub-pixel 121 of the sub-pixel column SC1B (e.g. two compensation sub-pixels 141B, 141C in FIG. 4 of this embodiment), the transmittance of the compensation sub-pixel 141A in the sub-pixel column SC1A can be greater than the transmittance of the compensation sub-pixel 141B in the sub-pixel column SC1B. In this embodiment, the structure of the sub-pixel unit SPU of the compensation sub-pixel 141A may be different from the structure of the sub-pixel unit SPU of the compensation sub-pixel 141B, such that the transmittance of the compensation sub-pixel 141A can be different from the transmittance of the compensation sub-pixel 141B.

Furthermore, when the number of the compensation sub-pixels located between the first end and the inner sub-pixels of the sub-pixel column is greater than or equal to 2, the farther the distance between the compensation sub-pixel and the first end is, the more the transmittance of the compensation sub-pixel of the corresponding sub-pixel column may be. Taking the sub-pixel column SC1B as an example, the sub-pixel column SC1B includes a compensation sub-pixel 141C located between the compensation sub-pixel 141B and the inner sub-pixel 121, the distance between the compensation sub-pixel 141C and the first end Ed1B is greater than the distance between the compensation sub-pixel 141B and the first end Ed1B, the structure of the sub-pixel unit SPU of the compensation sub-pixel 141C may be different from the structure of the sub-pixel unit SPU of the compensation sub-pixel unit 141B, and the transmittance of the compensation sub-pixel 141C may be greater than the transmittance of the compensation sub-pixel 141B. In some embodiments, in two adjacent sub-pixel columns corresponding to the same color, the numbers of the compensation sub-pixels located between the first end and the inner sub-pixel may be the same as each other. In such situation, the structure of the sub-pixel unit SPU and the transmittance of the compensation sub-pixel closest to the end of one of the two adjacent sub-pixel columns may be respectively the same as the structure of the sub-pixel unit SPU and the transmittance of the compensation sub-pixel closest to the end of the other of the two adjacent sub-pixel columns. It is noted that formula (1) is for an example, but not limited thereto. In the invention, the formula of the transmittance of the compensation sub-pixel may be adjusted, and the calculated result of the adjusted formula may also show that the transmittance(s) of the compensation sub-pixel(s) between the first end and the inner sub-pixel of the sub-pixel column is or are less than the transmittance of the inner sub-pixel of the sub-pixel column, and the transmittances of a plurality of compensation sub-pixels disposed between the first end and the inner sub-pixel of the sub-pixel column are sequentially reduced along a direction from the inner sub-pixel toward the first end of the sub-pixel column, so as to reduce the zigzag appearance at the edge of the non-rectangular display region AA of the display panel 10.

In some embodiments, some sub-pixel columns may further include a peripheral sub-pixel 170 located between an end and the compensation sub-pixel of the corresponding sub-pixel column and crossing the edge of the display region AA. The structures of the sub-pixel units SPU of the peripheral sub-pixels 170 in the sub-pixel columns SC1, SC2, SC3 are the same as the structures of the sub-pixel units SPU of the inner sub-pixel units 121, 122, 123, respectively. For example, the sub-pixel column SC1A may further include a peripheral sub-pixel 170A located between the first end Ed1A of the sub-pixel column SC1A and the compensation sub-pixel 141A, and the structure of the sub-pixel unit SPU of the peripheral sub-pixel 170A is the same as the structure of the sub-pixel unit SPU of the inner sub-pixel 121. It is noted that the region of the peripheral sub-pixel 170A may partially overlap the first part P1 the light shielding layer BM, and the overlapping area of the first part P1 and the region of the peripheral sub-pixel 170A may be greater than the overlapping area of the first part P1 and the region of the compensation sub-pixel 141A. In other words, the opening of the light shielding sub-block SBLK of the peripheral sub-pixel 170A is less than the opening of the light shielding sub-block SBLK of the compensation sub-pixel 141A, so that the area of the display area of the peripheral sub-pixel 170A is less than the area of the display area of the compensation sub-pixel 141A, that is, the transmittance of the peripheral sub-pixel 170A can be less than the transmittance of the compensation sub-pixel 141A. Thus, in the embodiment where the structure of the sub-pixel unit SPU of the peripheral sub-pixel 170A is the same as the structure of the sub-pixel unit SPU of the inner sub-pixel 121, the transmittances of a plurality of sub-pixels (peripheral sub-pixel 170A and compensation sub-pixel 141A) located between the first end Ed1A and the inner sub-pixel 121 of the first sub-pixel column SC1A can be sequentially reduced along the direction from the inner sub-pixel 121 to the first end Ed1A (i.e. the first direction D1 in this embodiment), thereby reducing the zigzag appearance at the edge of the display region AA. Similarly, the peripheral sub-pixel 170B is disposed between the first end Ed1B and the compensation sub-pixel 141B of the sub-pixel column SC1B, in which the structure of the sub-pixel unit SPU of the peripheral sub-pixel 170B is the same as the structure of the sub-pixel unit SPU of the inner sub-pixel 121. The above description takes two sub-pixel columns SC1A and SC1B corresponding to the first color in FIG. 4 as an example, and similarly, the arrangement of the peripheral sub-pixels 170 of other sub-pixel columns corresponding to the first color and the arrangement of the peripheral sub-pixels 170 of the sub-pixel columns corresponding to the second color or the third color may also be similar to the arrangement mentioned above and will not be repeated herein. Generally, in the design stage of the display panel 10 having the non-rectangular display region AA, the structures of the pixel units PU of all pixels PX are set to be the same first, and then, the structures of the sub-pixel units SPU of at least some of the sub-pixels SPX crossing or near the edge of the display region AA are modified to be the structures of the sub-pixel units SPU of the compensation sub-pixels. By means of the disposition of the peripheral sub-pixels 170, the number of the sub-pixels SPX to be modified as the compensation sub-pixels can be reduced to shorten the design time of the display panel 10. It is noted that in some embodiments, the display panel 10 may not include peripheral sub-pixels 170.

As shown in FIG. 4, in some embodiments, at least a part of the sub-pixel columns may further include at least one dummy sub-pixel 160 disposed between the first end and the compensation sub-pixel of the sub-pixel column, in which the dummy sub-pixel 160 is fully located in the peripheral region PA and the region of the dummy sub-pixel 160 is fully covered by the first part P1 of the shielding layer BM, that is, the dummy sub-pixel 160 cannot display images. In the embodiment that the sub-pixel column includes the peripheral sub-pixel 170 and the compensation sub-pixel, the dummy sub-pixel 160 is further disposed between the first end of the sub-pixel column and the peripheral sub-pixel 170. In other words, the dummy sub-pixel 160 may be a sub-pixel closest to the first end of the corresponding sub-pixel column, but not limited thereto. For example, the sub-pixel columns SC1A and SC1B respectively include dummy sub-pixels 160A and 160B, which are respectively disposed between the first end Ed1A and the peripheral sub-pixel 170A of the sub-pixel column SC1A and between the first end Ed1B and the peripheral sub-pixel 170B of the sub-pixel column SC1B. It is noted that in some embodiments, the display panel 10 may not include the dummy sub-pixels 160.

Figure 5:
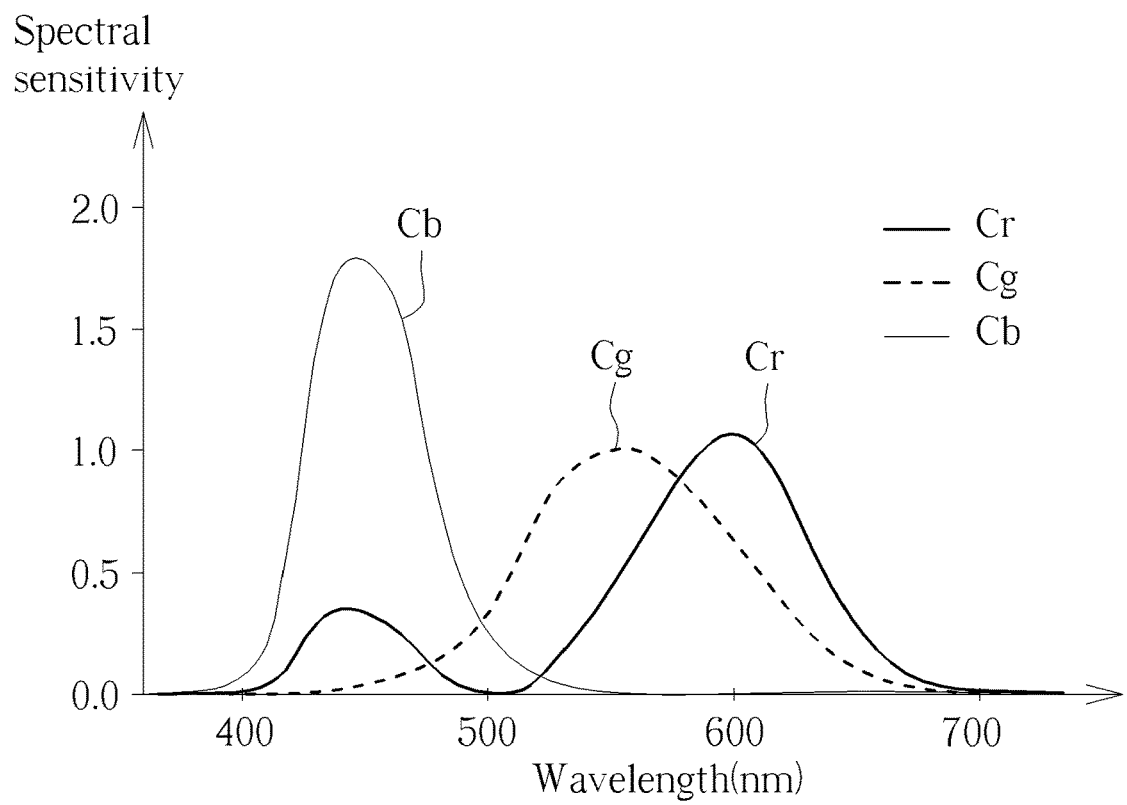
FIG. 5 schematically illustrates color matching functions of CIE 1931 corresponding to different colors.

Please refer to FIG. 5, which schematically illustrates color matching functions of CIE 1931 corresponding to different colors. The stimulus value of red color X may be proportional to the integral value of the product of the transmission spectrum of the display panel 10 and the matching function of red color Cr. Similarly, the stimulus value of greed color Y and the stimulus value of blue color Z may be proportional to the integral value of the product of the transmission spectrum of the display panel 10 and the matching function of green color Cg and the integral value of the product of the transmission spectrum of the display panel 10 and the matching function of blue color Cb, respectively. The calculation methods of the matching functions of colors, and the stimulus values of red, green and blue colors are well known to those skilled in the art and will not be detailed redundantly. In this embodiment, the stimulus value of green color Y is greater than the stimulus value of red color X, and the stimulus value of red color X is greater than the stimulus value of blue color Z, but not limited thereto. In other words, the human eye is more sensitive to green than to red, and more sensitive to red than to blue. Therefore, the relationship between the stimulus value of color I and the transmittance $T_N$ of the compensation sub-pixel in formula (1) takes the difference of the sensitivities of human eyes to different colors into account to optimize the transmittances of the compensation sub-pixels corresponding to different colors. Thus, the compensation sub-pixels in the same pixel PX may have different transmittances, and the structures of the sub-pixel units SPU of the compensation sub-pixels in the same pixel PX may be different from each other, but not limited thereto. For example, as shown in FIG. 4, the sub-pixel columns SC1A, SC2A, SC3A include compensation sub-pixels 141A, 142A, 143A, respectively, and the compensation sub-pixels 141A, 142A, 143A compose a pixel PX. The colors of the compensation sub-pixels 141A, 142A, 143A are different from each other, therefore, the transmittances of the compensation sub-pixels 141A, 142A, 143A may be different from each other, and the structures of the sub-pixel units SPU of the compensation sub-pixels 141A, 142A, 143A may be different from each other.

Figure 6:
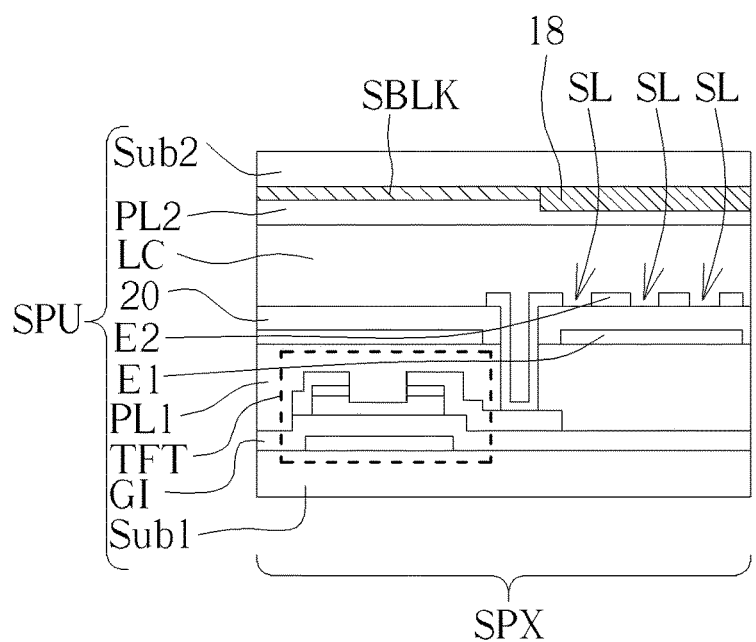
FIG. 6 schematically illustrates a cross-sectional view of a sub-pixel according to a first embodiment of the present invention.

The structures of the inner sub-pixel and the compensation sub-pixel will be further described below. Please refer to FIG. 6, which schematically illustrates a cross-sectional view of a sub-pixel according to a first embodiment of the present invention, in which FIG. 6 takes a single sub-pixel as an example, and not limited thereto. As shown in FIG. 6, the sub-pixel SPX may include the sub-pixel unit SPU, the light shielding sub-block SBLK and the color filter block 18. It is noted that the sub-pixel unit SPU in this embodiment does not include the light shielding sub-block SBLK and the color filter block 18.

The sub-pixel unit SPU includes components for controlling grey scales of the corresponding sub-pixel SPX. In this embodiment, each sub-pixel unit SPU may include a first electrode E1, a liquid crystal layer LC and a second electrode E2 located between the first electrode E1 and the liquid crystal layer LC, and each second electrode E2 has at least one slit SL. For example, the first electrode E1 and the second electrode E2 in this embodiment may be a common electrode and a pixel electrode, respectively, and the second electrode E2 is electrically connected to the thin-film transistor TFT, but the present invention is not limited to this. In a variant embodiment, the first electrode E1 may be the pixel electrode electrically connected to the thin film transistor TFT, and the second electrode E2 may be the common electrode having at least one slit SL. Regarding the variant embodiment, please see the following description for FIG. 11. Through the slit SL of the second electrode E2, the electric field may be generated between the second electrode E2 and the first electrode E1, and the electric field can control the rotations of the liquid crystal molecules in the liquid crystal layer LC, thereby adjusting the transmittance of the sub-pixel SPX. Therefore, by means of changing the width of the slit SL of the second electrode E2 of the sub-pixel unit SPU to adjust the transmittances of the sub-pixels SPX, the brightness of the sub-pixels SPX crossing the edge of the display region AA or near the edge of the display region AA can be reduced, so as to reduce the zigzag appearance at the edge of the non-rectangular display region AA and improve the display quality of the display panel 10. In this embodiment, the second electrode E2 may have multiple slits SL, and the slits SL may have the same width, but not limited thereto. In addition, in this embodiment, each sub-pixel unit SPU may further include an insulating layer 20 disposed between the first electrode E1 and the second electrode E2, the insulating layer 20 covers the first electrode E1, and the second electrode E2 is disposed on the insulating layer 20, but not limited thereto.

In this embodiment, each sub-pixel unit SPU may further include, for example, a portion of a lower substrate Sub1, a thin film transistor TFT, a portion of a data line (not shown), a portion of a scan line (not shown), a portion of a gate insulating layer GI, a portion of a lower planarization layer PL1, a portion of a lower alignment layer (not shown), a portion of an upper planarization layer PL2, a portion of an upper alignment layer (not shown), and a portion of an upper substrate Sub2, but not limited thereto. In addition to the components of the sub-pixel unit SPU described above, each sub-pixel unit SPU may further include a portion of a lower polarizer and a portion of an upper polarizer in some embodiments, but not limited thereto. It is noted that in some embodiments, the transmittance of the sub-pixel unit SPU may be defined as the transmittance of light passing through the sub-pixel unit SPU, but not limited thereto. Those skilled in the art will know that the structures of sub-pixel units SPU may vary according to the type of display panel, so the transmittance of each sub-pixel unit SPU may be determined according to the type of display panel.

Figure 7:
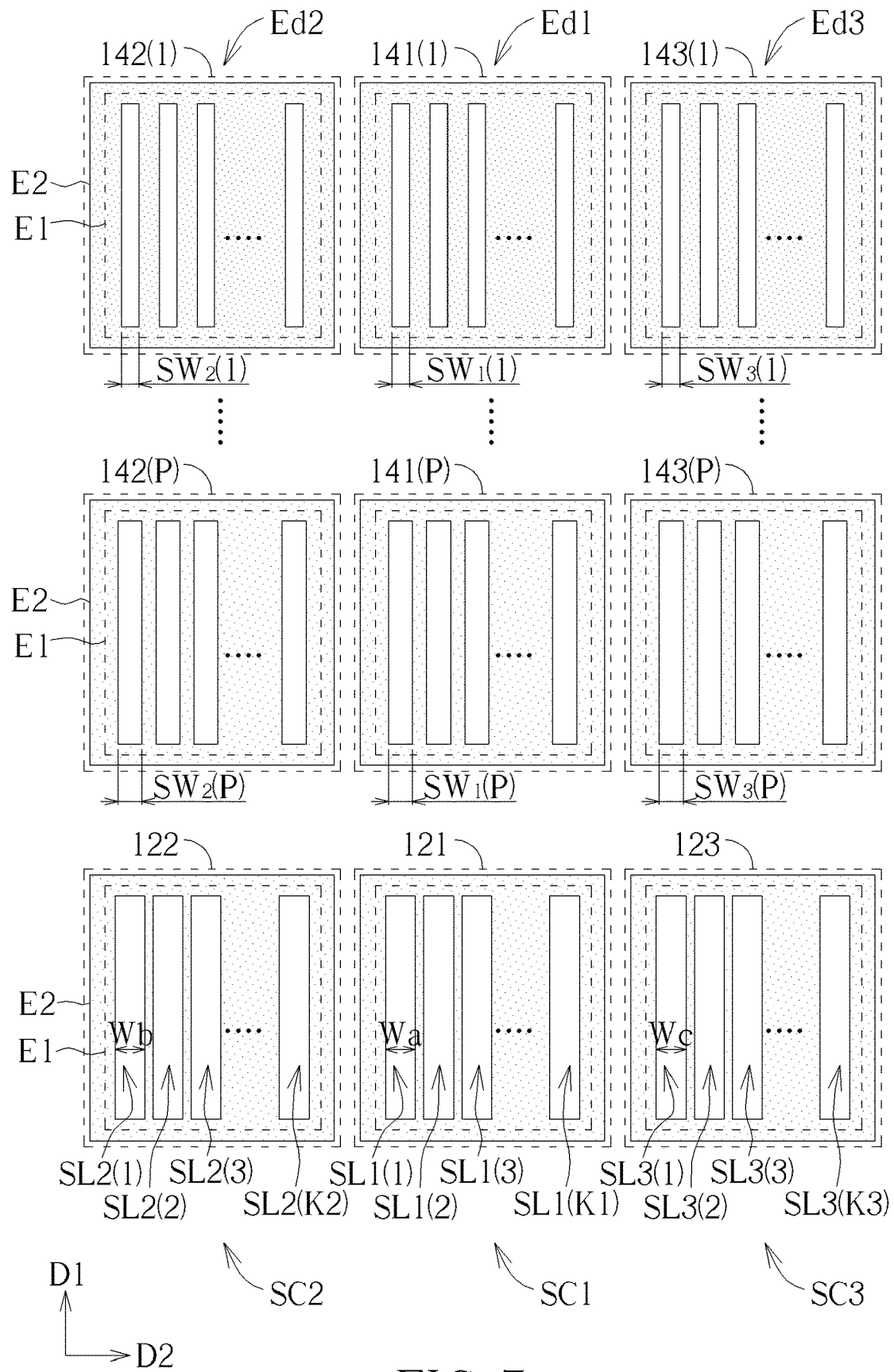
FIG. 7 schematically illustrates a top view of the first electrodes and the second electrodes of the inner sub-pixel and the compensation sub-pixels according to the first embodiment of the present invention.

The method for adjusting the transmittance of the compensation sub-pixel will be further explained below. In the first embodiment of the present invention, in the same sub-pixel column, the width of the slit SL of the second electrode E2 of the compensation sub-pixel may be less than the width of the slit SL of the second electrode E2 of the inner sub-pixel. Furthermore, in the embodiment where a plurality of compensation sub-pixels are arranged between the inner sub-pixel and the first end of the sub-pixel column, the widths of the slits SL of the second electrodes E2 of the compensation sub-pixels are sequentially reduced along the direction from the inner sub-pixel to the first end of the sub-pixel column, so that the transmittances of the compensation sub-pixels between the first end and the inner sub-pixel of the sub-pixel column are less than the transmittance of the inner sub-pixel of the sub-pixel column, and the transmittances of the plurality of compensation sub-pixels are sequentially decreased along the direction from the inner sub-pixel toward the first end of the sub-pixel column, so as to reduce the zigzag appearance at the edge of the non-rectangular display region AA of the display panel 10. Please refer to FIG. 7, which schematically illustrates a top view of the first electrodes and the second electrodes of the inner sub-pixel and the compensation sub-pixels according to the first embodiment of the present invention. P number of compensation sub-pixels 141 ($1^{st}$ to $P^{th}$ compensation sub-pixels 141(1)-141(P)), P number of compensation sub-pixels 142 ($1^{st}$ to $P^{th}$ compensation sub-pixels 142(1)-142(P)), and P number of compensation sub-pixels 143 ($1^{st}$ to $P^{th}$ compensation sub-pixels 143(1)-143(P)) are respectively disposed between the inner sub-pixel 121 and the first end Ed1 of the sub-pixel column SC1, the inner sub-pixel 122 and the first end Ed2 of the sub-pixel column SC2, and the inner sub-pixel 123 and the first end Ed3 of the sub-pixel column SC3, P is a positive integer greater than 1, and each of the second electrodes E2 of the inner sub-pixels 121, 122, 123 and the compensation sub-pixels 141, 142, 143 has at least one slit. It is noted that, for ease of explanation, FIG. 7 illustrates an embodiment that multiple compensation sub-pixels are disposed between the first end and the inner sub-pixel of the sub-pixel column (i.e. P is a positive integer greater than 1), and another embodiment that only one compensation sub-pixel is disposed between the first end and the inner sub-pixel of the sub-pixel column (i.e. P is equal to 1) can be analogized and will not be detailed redundantly. As shown in FIG. 7, the $1^{st}$ to the $P^{th}$ compensation sub-pixels 141(1)-141(P) are sequentially disposed between the first end Ed1 and the inner sub-pixels 121 of the sub-pixel columns SC1 along a direction from the first end Ed1 to the inner sub-pixels 121, the $1^{st}$ to the $P^{th}$ compensation sub-pixels 142(1)-142(P) are sequentially disposed between the first end Ed2 and the inner sub-pixels 122 of the sub-pixel columns SC2 along a direction from the first end Ed2 to the inner sub-pixels 122, the $1^{st}$ to the $P^{th}$ compensation sub-pixels 143(1)-143(P) are sequentially disposed between the first end Ed3 and the inner sub-pixels 123 of the sub-pixel columns SC3 along a direction from the first end Ed3 to the inner sub-pixels 123. In the embodiment of FIG. 7, the direction from the first end Ed1 to the inner sub-pixels 121, the direction from the first end Ed2 to the inner sub-pixels 122, and the direction from the first end Ed3 to the inner sub-pixels 123 are the direction opposite to the first direction D1. Each of the second electrodes E2 of the inner sub-pixels 121, 122, 123 and the $1^{st}$ to the $P^{th}$ compensation sub-pixels 141(1)-141(P), 142(1)-142(P), 143(1)-143(P) has a plurality of slits. The width of each slit of the second electrodes E2 of the $1^{st}$ to the $P^{th}$ compensation sub-pixels 141(1)-141(P) located in the sub-pixel column SC1 is less than the width of each slit of the second electrode E2 of the inner sub-pixel 121, and the widths of the slits of the second electrodes E2 of the $1^{st}$ to the $P^{th}$ compensation sub-pixels 141(1)-141(P) are sequentially increased along the direction from the first end Ed1 to the inner sub-pixel 121 of the pixel column (i.e. the first direction D1 in the embodiment of FIG. 7), such that the transmittances of the $1^{st}$ to the $P^{th}$ compensation sub-pixels 141(1)-141(P) of the sub-pixel column SC1 are less than the transmittance of the inner sub-pixel 121 of the sub-pixel column SC1, and the transmittances of the $P^{th}$ to the $1^{st}$ compensation sub-pixels 141(P)-141(1) are sequentially decreased along the direction from the inner sub-pixel 121 of the sub-pixel column SC1 toward the first end Ed1 of the sub-pixel column SC1, thereby reducing the zigzag appearance at the edge of the non-rectangular display region AA of the display panel 10. In other words, the width of the slit of the $(i+1)^{th}$ compensation sub-pixel 141(i+1) is greater than the width of the slit of the $i^{th}$ compensation sub-pixel 141(i), and i is a positive integer greater than or equal to 1 and smaller than or equal to (P−1). The arrangement of the widths of the slits of the second electrodes E2 of the $1^{st}$ to the $P^{th}$ compensation sub-pixels 142(1)-142(P) and the inner sub-pixel 122 located in the sub-pixel column SC2 and the arrangement of the widths of the slits of the second electrodes E2 of the $1^{st}$ to the $P^{th}$ compensation sub-pixels 143(1)-143(P) and the inner sub-pixel 123 located in the sub-pixel column SC3 are similar to the arrangement of the widths of the slits of the second electrodes E2 of the $1^{st}$ to the $P^{th}$ compensation sub-pixels 141(1)-141(P) and the inner sub-pixel 121 located in the sub-pixel column SC1, and will not be detailed redundantly. Please refer to the following formulas (2A)-(2C):

$$SWT_1(N) = \frac{TS_1 \times N}{(P+1)}, \quad (2A)$$

$$SWT_2(N) = \frac{TS_2 \times N}{(P+1)}, \quad (2B)$$

$$SWT_3(N) = \frac{TS_3 \times N}{(P+1)}, \quad (2C)$$

$TS_1$, $TS_2$, and $TS_3$ are the sums of the widths of the slits of the second electrodes E2 of the inner sub-pixels 121, 122, 123, respectively. For example, the second electrodes E2 of the inner sub-pixels 121, 122, 123 have K1 number of slits SL1(1)-SL1(K1), K2 number of slits SL2(1)-SL2(K2), K3 number of slits SL3(1)-SL3(K3), respectively, where K1, K2, K3 are positive integers greater than or equal to 1, and at least two of K1, K2, K3 are the same or K1, K2, K3 are different from each other. The width of each slit SL1(1)-SL1(K1) is Wa, the width of each slit SL2(1)-SL2(K2) is Wb, and the width of each slit SL3(1)-SL3(K3) is Wc, at least two of Wa, Wb, Wc are the same or Wa, Wb, Wc are different from each other, and TS1, TS2, and TS3 are equal to K1×Wa, K2×Wb, K3×Wc, respectively. $SWT_1(N)$, $SWT_2(N)$, $SWT_3(N)$ are respectively the sums of the widths of the slits of the $N^{th}$ compensation sub-pixels 141(N), 142(N), 143(N), and N is a positive integer greater than or equal to 1 and less than or equal to P. For example, the second electrode E2 of the $N^{th}$ compensation sub-pixel 141(N) has K1 slits, and the sum of the widths of the K1 slits is equal to $TS_1$ multiplied by N and divided by (P+1).

In addition, the $N^{th}$ compensation sub-pixels 141(N), 142(N), 143(N) respectively corresponding to the first color, the second color and the third color compose a pixel PX, and the stimulus values of the first color, the second color and the third color may be different from each other according to the description of FIG. 5 mentioned above, therefore, the calculation formulas of $SWT_1(N)$, $SWT_2(N)$, $SWT_3(N)$ which are respectively the sums of the widths of the slits of the $N^{th}$ compensation sub-pixels 141(N), 142(N), 143(N) may be modified to be the following formulas (3A)-(3C) in the present invention, in order to compensate the sensitivity of human eyes, so as to obtain a better visual effect:

$$SWT_{1\_com}(N) = \frac{(SWT_1(N) + SWT_2(N) + SWT_3(N)) \times I_2 \times I_3}{(I_1 + I_2 + I_3)}, \quad (3A)$$

$$SWT_{2\_com}(N) = \frac{(SWT_1(N) + SWT_2(N) + SWT_3(N)) \times I_1 \times I_3}{(I_1 + I_2 + I_3)}, \quad (3B)$$

$$SWT_{3\_com}(N) = \frac{(SWT_1(N) + SWT_2(N) + SWT_3(N)) \times I_1 \times I_2}{(I_1 + I_2 + I_3)}, \quad (3C)$$

where $I_1$, $I_2$, $I_3$ are stimulus values of colors of the corresponding sub-pixel columns SC1, SC2, SC3, respectively, and $SWT_{1\_com}(N)$, $SWT_{2\_com}(N)$, $SWT_{3\_com}(N)$ are respectively the sums of the widths of the slits of the $N^{th}$ compensation sub-pixel 141(N), 142(N), 143(N). For example, when the sub-pixel columns SC1, SC2, SC3 respectively correspond to green, red and blue, $I_1$, $I_2$, $I_3$ are stimulus values Y, X, Z, respectively.

Please further refer to the following formulas (4A)-(4C):

$$SW_1(N) = \frac{SWT_{1\_com}(N)}{K1}, \quad (4A)$$

$$SW_2(N) = \frac{SWT_{2\_com}(N)}{K2}, \quad (4B)$$

$$SW_3(N) = \frac{SWT_{3\_com}(N)}{K3}, \quad (4C)$$

where K1, K2, K3 are respectively the numbers of the slits of the second electrodes E2 of the $N^{th}$ compensation sub-pixels 141(N), 142(N), 143(N), $SW_1(N)$ is the width of each slit of the second electrode E2 of the $N^{th}$ compensation sub-pixel 141(N), $SW_2(N)$ is the width of each slit of the second electrode E2 of the $N^{th}$ compensation sub-pixel 142(N), and $SW_3(N)$ is the width of each slit of the second electrode E2 of the $N^{th}$ compensation sub-pixel 143(N). It is noted that in the embodiment where P is equal to 1, for example, only one compensation sub-pixel 141 is disposed between the first end Ed1 and the inner sub-pixel 121 of the sub-pixel column SC1, only one compensation sub-pixel 142 is disposed between the first end Ed2 and the inner sub-pixel 122 of the sub-pixel column SC2, and only one compensation sub-pixel 143 is disposed between the first end Ed3 and the inner sub-pixel 123 of the sub-pixel column SC3, N is equal to 1 in the formulas (2A)-(2C), (3A)-(3C) and (4A)-(4C), $SW_1(1)$ is the width of each slit of the second electrode E2 of the compensation sub-pixel 141, $SW_2(1)$ is the width of each slit of the second electrode E2 of the compensation sub-pixel 142, and $SW_3(1)$ is the width of each slit of the second electrode E2 of the compensation sub-pixel 143.

Based on the formulas (2A)-(4C), in the same sub-pixel column, the width of each slit of the second electrode E2 of the compensation sub-pixel is less than the width of each slit of the second electrode E2 of the inner sub-pixel. Furthermore, in an embodiment that a plurality of compensation sub-pixels are disposed between the inner sub-pixel and the first end of the sub-pixel column, the widths of the slits of the second electrodes E2 of the compensation sub-pixels are sequentially decreased along the direction from the inner sub-pixel to the first end of sub-pixel column (the first direction D1 in the embodiment of FIG. 7). That is, $1^{st}$ to $P^{th}$ compensation sub-pixels (i.e. P number of compensation sub-pixels) are sequentially disposed between the first end and the inner sub-pixel of the sub-pixel column along a direction from the first end to the inner sub-pixel, P is a positive integer greater than or equal to 2, the width of each slit of the second electrodes E2 of the $i^{th}$ compensation sub-pixels is less than the width of each slit of the second electrodes E2 of the $(i+1)^{th}$ compensation sub-pixel, and i is a positive integer greater than or equal to 1 and smaller than or equal to (P−1). For example, taking the sub-pixel columns SC1A and SC1B corresponding to the first color in FIG. 4 as an example, a compensation sub-pixel 141A is disposed between the first end Ed1A and the inner sub-pixel 121 of the sub-pixel column SC1A, and two compensation sub-pixels 141B and 141C are disposed between the first end Ed1B and the inner sub-pixel 121 of the sub-pixel column SC1B. The width of each slit of the second electrode E2 of the compensation sub-pixel 141A, 141B, 141C is less than the width of each slit of the second electrode E2 of the inner sub-pixel 121, and in the sub-pixel column SC1B, the width of each slit of the second electrode E2 of the compensation sub-pixel 141B is less than the width of each slit of the second electrode E2 of the compensation sub-pixel 141C.

Figure 8:
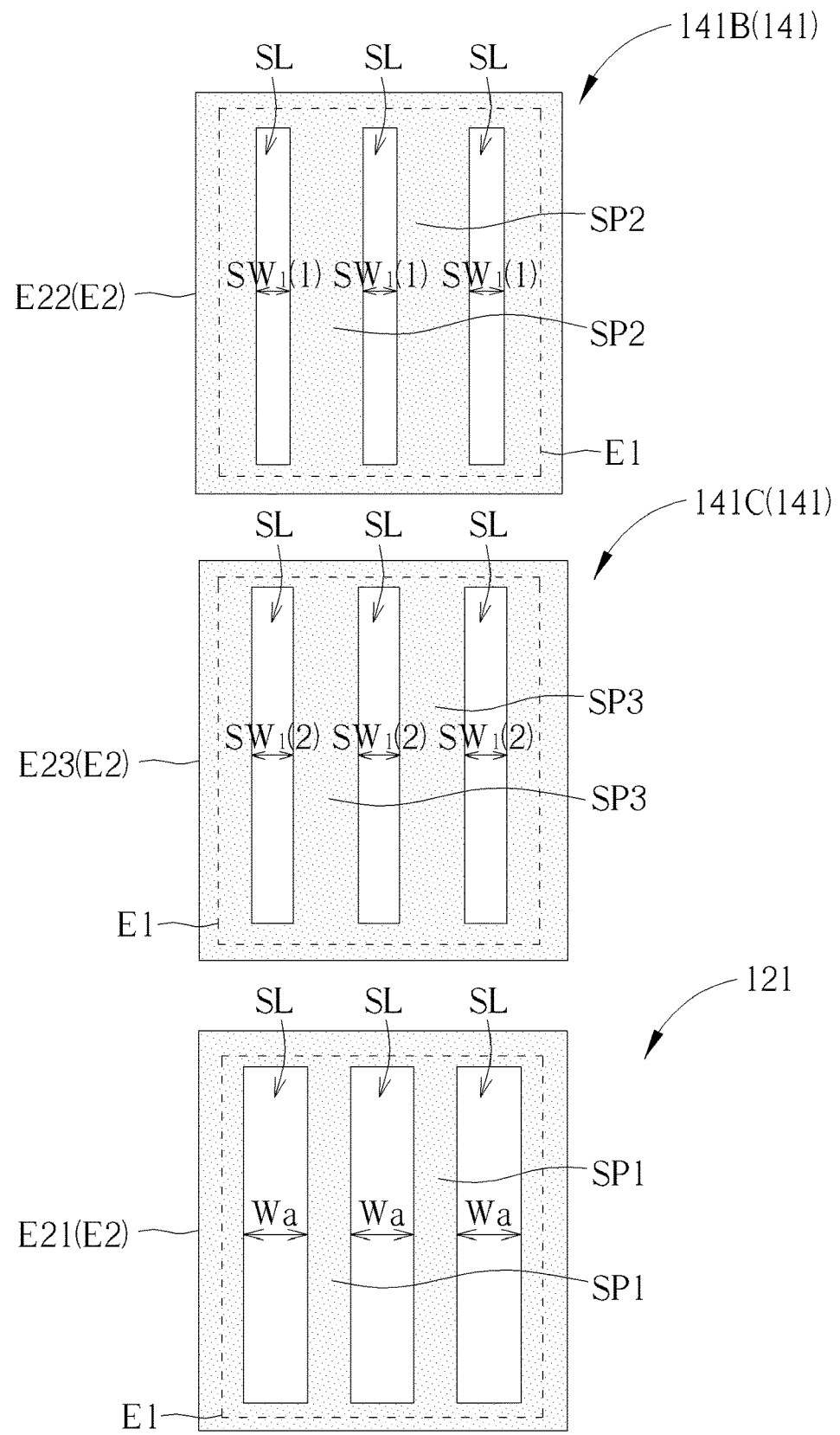
FIG. 8 schematically illustrates a top view of the first electrodes and the second electrodes of the inner sub-pixel and the compensation sub-pixels corresponding to the sub-pixel column SC1B in FIG. 4 according to the first embodiment of the present invention.

Further, the number of the compensation sub-pixel 141 between the first end Ed1A and the inner sub-pixel 121 of the sub-pixel column SC1A is different from the number of the compensation sub-pixels 141 between the first end Ed1B and the inner sub-pixel 121 of the sub-pixel column SC1B. Thus, the width of each slit of the second electrode E2 of the compensation sub-pixel 141A closest to the first end Ed1A of the sub-pixel column SC1A is different from the width of each slit of the second electrode E2 of the compensation sub-pixel 141B closest to the first end Ed1B of the sub-pixel column SC1B, so that the transmittance of the compensation sub-pixel 141A is different from the transmittance of the compensation sub-pixel 141B. The compensation sub-pixel 141A is the compensation sub-pixel closest to the first end Ed1A of the sub-pixel column SC1A, and the compensation sub-pixel 141B is the compensation sub-pixel closest to the first end Ed1B of the sub-pixel column SC1B, therefore, the compensation sub-pixel 141A, 141B may also be called a outermost compensation sub-pixel of the sub-pixel column SC1A and a outermost compensation sub-pixel of the sub-pixel column SC1B, respectively. For example, the width of each slit of the second electrode E2 of the compensation sub-pixel 141A is greater than the width of each slit of the second electrode E2 of the compensation sub-pixel 141B. Specifically, please refer to FIG. 8 and FIG. 4. FIG. 8 schematically illustrates a top view of the first electrodes E1 and the second electrodes E2 of the inner sub-pixel and the compensation sub-pixels according to the first embodiment of the present invention, in which the inner sub-pixel and the compensation sub-pixel are respectively exemplified by the inner sub-pixel 121 and the compensation sub-pixels 141B and 141C of the sub-pixel column SC1B in FIG. 4, but not limited thereto. As shown in FIG. 8, the width Wa of each slit SL of the inner sub-pixel 121 of this embodiment is greater than the width $SW_1(2)$ of each slit SL of the compensation sub-pixel 141C, and the width $SW_1(2)$ of each slit SL of the compensation sub-pixel 141C is greater than the width $SW_1(1)$ of each slit SL of the compensation sub-pixel 141B. In general, the widths of the second electrodes E2 of the inner sub-pixel and the compensation sub-pixel in a horizontal direction HD may be the same, so when the width of each slit SL of the second electrode E2 is reduced, the width of each strip portion of the second electrode E2 increases, but not limited thereto. For example, the width of the strip portion SP1 of the second electrode E21 of the inner sub-pixel 121 in the horizontal direction HD may be less than the width of the strip portion SP3 of the second electrode E23 of the compensation sub-pixel 141C in the horizontal direction HD, and the width of the strip portion SP3 of the second electrode E23 of the compensation sub-pixel 141C in the horizontal direction HD is less than the width of the strip portion SP2 of the second electrode E22 of the compensation sub-pixel 141B in the horizontal direction HD, but not limited thereto. The horizontal direction HD may be, for example, the second direction D2 in FIG. 7 in this embodiment, but not limited thereto.

It is noted that by means of adjusting the width of each slit of the second electrode E2 of the compensation sub-pixel as described above, when the inner sub-pixels 121, 122, 123 and the compensation sub-pixels 141, 142, 143 operate at the same grey scale, the transmittances of the compensation sub-pixels 141, 142, 143 are less than the transmittances of the inner sub-pixels 121, 122, 123, respectively, and when a plurality of compensation sub-pixels are disposed between the first end and the inner sub-pixels of the sub-pixel column, the transmittances of the compensation sub-pixels are decreased sequentially along the direction from the inner sub-pixel of the sub-pixel column to the first end of the sub-pixel column. Therefore, the brightness of light generated by the compensation sub-pixels 141, 142, 143 can be reduced, thereby reducing the jagged appearance at the edge of the non-rectangular panel and further improving the display quality of the display panel 10. It should be noted that the formulas (2A)-(4C) are examples, but not limited thereto. According to the present invention, the formula of the width of each slit of the second electrode E2 of the compensation sub-pixel can be adjusted, and the calculated result of the adjusted formula also shows that in the sub-pixel column, the width of each slit of the second electrode E2 of the compensation sub-pixel is less than the width of each slit of the second electrode E2 of the inner sub-pixel. In the embodiment that a plurality of compensation sub-pixels are disposed between the inner sub-pixel and the first end of the sub-pixel column, the widths of the slits of the second electrodes E2 of the compensation sub-pixels are decreased sequentially along the direction from the inner sub-pixel to the first end of the sub-pixel column, so that the transmittances of the compensation sub-pixels between the first end and the inner sub-pixels of the sub-pixel column are less than the transmittance of the inner sub-pixel of the sub-pixel column, and in the embodiment where a plurality of compensation sub-pixels are disposed between the inner sub-pixel and the first end of the sub-pixel column, the transmittances of the plurality of compensation sub-pixels are decreased sequentially along the direction from the inner sub-pixel of the sub-pixel column toward the first end of the sub-pixel column, so as to reduce the jagged appearance at the edge of the non-rectangular display region AA of the display panel 10.

The display panel of the present invention is not limited to the above embodiments. Other embodiments of the present invention are disclosed below. However, in order to simplify the description and highlight the differences between the embodiments, same components are labeled with the same symbol in the following, and the identical features will not be redundantly described.

Figure 9:
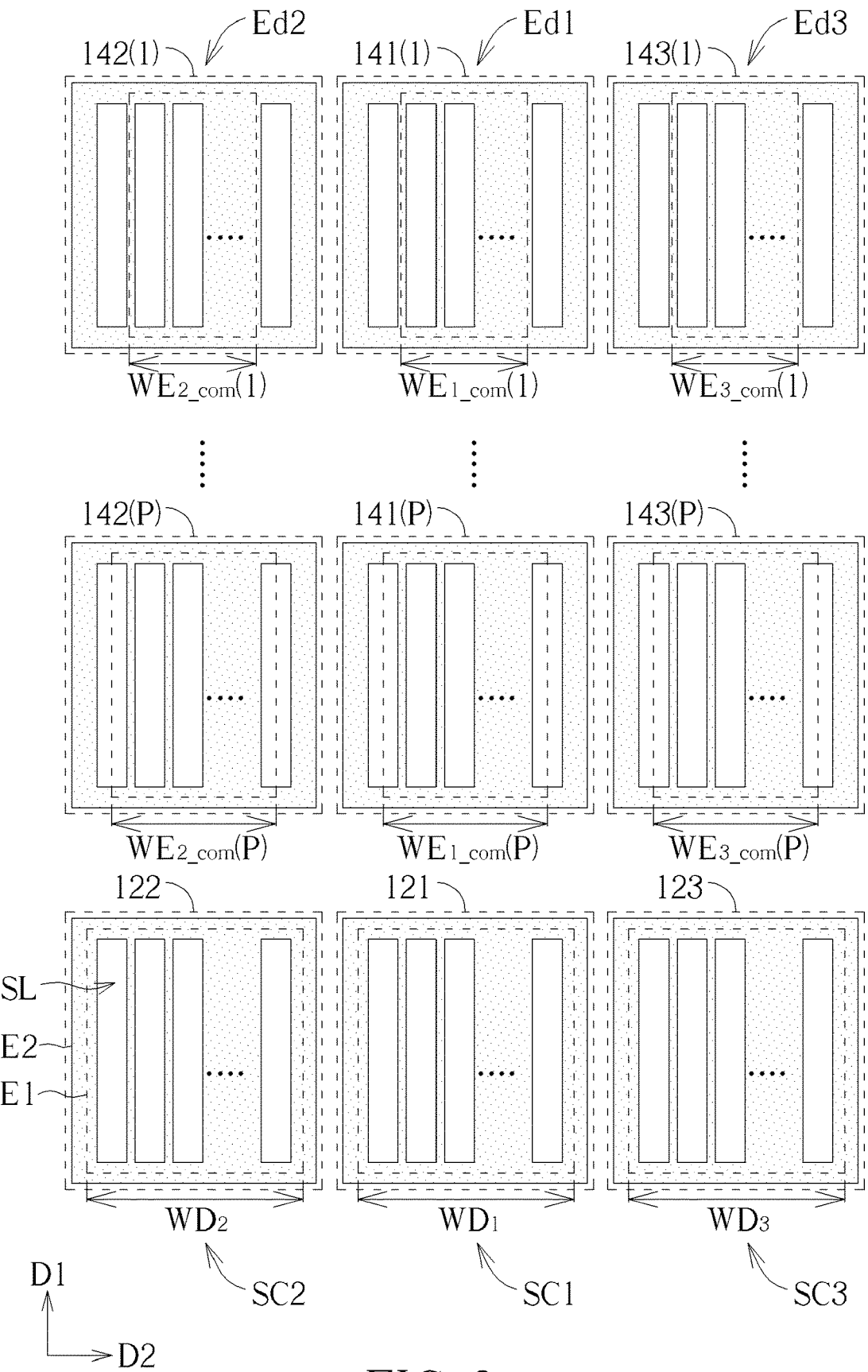
FIG. 9 schematically illustrates a top view of the first electrodes and the second electrodes of the inner sub-pixel and the compensation sub-pixels according to the second embodiment of the present invention.

In the second embodiment of the present invention, the width of the first electrode E1 of each compensation sub-pixel may be less than the width of the first electrode E1 of the inner sub-pixel in the sub-pixel column, and the widths of the first electrodes E1 of multiple compensation sub-pixels disposed between the inner sub-pixel and the first end of the sub-pixel column are decreased sequentially along the direction from the inner sub-pixel of the sub-pixel column to the first end of the sub-pixel column, such that the transmittance of the compensation sub-pixel is less than the transmittance of the inner sub-pixel, and the transmittances of the plurality of compensation sub-pixels disposed between the inner sub-pixel and the first end of the sub-pixel column are sequentially decreased along the direction from the inner sub-pixel of the sub-pixel column to the first end of the sub-pixel column, so as to mitigate the zigzag appearance at the edge of the non-rectangular display region AA. Please refer to FIG. 9, which schematically illustrates a top view of the first electrodes and the second electrodes of the inner sub-pixel and the compensation sub-pixels according to the second embodiment of the present invention. P number of compensation sub-pixels 141 ($1^{st}$ to $P^{th}$ compensation sub-pixels 141(1)-141(P)), P number of compensation sub-pixels 142 ($1^{st}$ to $P^{th}$ compensation sub-pixels 142(1)-142(P)), and P number of compensation sub-pixels 143 ($1^{st}$ to $P^{th}$ compensation sub-pixels 143(1)-143(P)) are respectively disposed between the inner sub-pixel 121 and the first end Ed1 of the sub-pixel column SC1, the inner sub-pixel 122 and the first end Ed2 of the sub-pixel column SC2, and the inner sub-pixel 123 and the first end Ed3 of the sub-pixel column SC3, P is a positive integer greater than 1, and each of the second electrodes E2 of the inner sub-pixels 121, 122, 123 and the compensation sub-pixels 141, 142, 143 has at least one slit. It is noted that, for ease of explanation, FIG. 9 illustrates an embodiment that multiple compensation sub-pixels are disposed between the first end and the inner sub-pixel of the sub-pixel column (i.e. P is a positive integer greater than 1), and another embodiment that only one compensation sub-pixel is disposed between the first end and the inner sub-pixel of the sub-pixel column (i.e. P is a positive integer equal to 1) can be analogized and will not be detailed redundantly. As shown in FIG. 9, the widths of the first electrodes E1 of the $1^{st}$ to the $P^{th}$ compensation sub-pixels 141(1)-141(P) are less than the width of the first electrode E1 of the inner sub-pixel 121 in the sub-pixel column SC1. In addition, the width of the first electrode E1 of the $i^{th}$ compensation sub-pixel 141(i) is less than the $(i+1)^{th}$ compensation sub-pixel 141(i+1), and i is a positive integer greater than or equal to 1 and less than or equal to (P−1). Therefore, the transmittances of the $1^{st}$ to the $P^{th}$ compensation sub-pixels 141(1)-141(P) are less than the transmittance of the inner sub-pixel 121 of the sub-pixel column SC1, and the transmittances of the $1^{st}$ to the $P^{th}$ compensation sub-pixels 141(1)-141(P) are sequentially decreased along the direction from the inner sub-pixel 121 toward the first end of the sub-pixel column SC1, thereby mitigating the zigzag appearance at the edge of the non-rectangular display region AA of the display panel 10. The arrangement of the widths of the first electrodes E1 of the $1^{st}$ to the $P^{th}$ compensation sub-pixels 142(1)-142(P) and the inner sub-pixel 122 located in the sub-pixel column SC2 and the arrangement of the widths of the first electrodes E1 of the $1^{st}$ to the $P^{th}$ compensation sub-pixels 143(1)-143(P) and the inner sub-pixel 123 located in the sub-pixel column SC3 are similar to the arrangement of the widths of the first electrodes E1 of the $1^{st}$ to the $P^{th}$ compensation sub-pixels 141(1)-141(P) and the inner sub-pixel 121 located in the sub-pixel column SC1 described above, and will not be detailed redundantly. Please refer to the following formulas (5A)-(5c):

$$WE_1(N) = \frac{(WD_1 \times N)}{(P+1)}, \quad (5A)$$

$$WE_2(N) = \frac{(WD_2 \times N)}{(P+1)}, \quad (5B)$$

$$WE_3(N) = \frac{(WD_3 \times N)}{(P+1)}, \quad (5C)$$

$WD_1$, $WD_2$ and $WD_3$ are the widths of the first electrodes E1 of the inner sub-pixels 121, 122, 123, respectively, and at least two of $WD_1$, $WD_2$ and $WD_3$ are the same or $WD_1$, $WD_2$ and $WD_3$ are different from each other. $WE_1(N)$, $WE_2(N)$, $WE_3(N)$ are respectively the widths of the first electrodes E1 of $N^{th}$ compensation sub-pixels 141(N), 142(N), 143(N), N is a positive integer greater than or equal to 1 and less than or equal to P. For example, the width $WE_1(N)$ of the first electrode E1 of the $N^{th}$ compensation sub-pixel 141(N) is equal to the width $WD_1$ of the first electrode E1 of the inner sub-pixel 121 multiplied by N and divided by (P+1).

In addition, the $N^{th}$ compensation sub-pixels 141(N), 142(N), 143(N) respectively corresponding to the first color, the second color and the third color compose a pixel PX, and the stimulus values of the first color, the second color and the third color may be different according to the description of FIG. 5 mentioned above. Therefore, the calculation formulas of the widths of the first electrodes E1 of the compensation sub-pixels 141(N), 142(N), 143(N) may be modified to be the following formulas (6A)-(6C) in the present invention, in order to compensate the sensitivity of human eyes to different colors, so as to obtain a better visual effect:

$$WE_{1\_com}(N) = \frac{(WE_1(N) + WE_2(N) + WE_3(N)) \times I_2 \times I_3}{(I_1 + I_2 + I_3)}, \quad (6A)$$

$$WE_{2\_com}(N) = \frac{(WE_1(N) + WE_2(N) + WE_3(N)) \times I_1 \times I_3}{(I_1 + I_2 + I_3)}, \quad (6B)$$

$$WE_{3\_com}(N) = \frac{(WE_1(N) + WE_2(N) + WE_3(N)) \times I_1 \times I_2}{(I_1 + I_2 + I_3)}, \quad (6C)$$

where $I_1$, $I_2$, $I_3$ are stimulus values of colors of the corresponding sub-pixel columns SC1, SC2, SC3, respectively, and $WE_{1\_com}(N)$, $WE_{2\_com}(N)$, $WE_{3\_com}(N)$ are the compensated widths of the first electrodes E1 of $N^{th}$ compensation sub-pixels 141(N), 142(N), 143(N). For example, when the sub-pixel columns SC1, SC2, SC3 respectively correspond to green, red and blue, $I_1$, $I_2$, $I_3$ are stimulus values Y, X, Z, respectively.

Based on the formulas (5A)-(6C), in the same sub-pixel column, the width of the first electrode E1 of the compensation sub-pixel is less than the width of the first electrode E1 of the inner sub-pixel. Furthermore, in an embodiment that a plurality of compensation sub-pixels are disposed between the inner sub-pixel and the first end of the sub-pixel column, the widths of the first electrodes E1 of the compensation sub-pixels are sequentially decreased along the direction from the inner sub-pixel to the first end of sub-pixel column (e.g. the first direction D1 in the embodiment of FIG. 9). That is, $1^{st}$ to $P^{th}$ compensation sub-pixels (i.e. P number of compensation sub-pixels) are sequentially disposed between the first end and the inner sub-pixel of the sub-pixel column along a direction from the first end to the inner sub-pixel, P is a positive integer greater than or equal to 2, the width of the first electrode E1 of the $i^{th}$ compensation sub-pixel is less than the width of the first electrode E1 of the $(i+1)^{th}$ compensation sub-pixel, and i is a positive integer greater than or equal to 1 and smaller than or equal to (P−1). For example, taking the sub-pixel columns SC1A and SC1B corresponding to the first color in FIG. 4 as an example, a compensation sub-pixel 141A is disposed between the first end Ed1A of the sub-pixel column SC1A and the inner sub-pixel 121, and two compensation sub-pixels 141B and 141C are disposed between the first end Ed1B of the sub-pixel column SC1B and the inner sub-pixel 121. Then, the widths of the first electrodes E1 of the compensation sub-pixel 141A, 141B, 141C are less than the width of the first electrode E1 of the inner sub-pixel 121, and in the sub-pixel column SC1B, the width of the first electrode E1 of the compensation sub-pixel 141B is less than the width of the first electrode E1 of the compensation sub-pixel 141C. Further, the compensation sub-pixel 141A is disposed between the first end Ed1A and the inner sub-pixel 121 of the sub-pixel column SC1A, and the compensation sub-pixels 141B, 141C are disposed between the first end Ed1B and the inner sub-pixel 121 of the sub-pixel column SC1B, therefore, the number P in the formulas (5A) is equal to 1 when the width of the first electrode E1 of the compensation sub-pixel 141A is calculated based on the formulas (5A), (6A), and the number P in the formulas (5A) is equal to 2 when the width of the first electrode E1 of the compensation sub-pixel 141B, 141C are calculated based on the formulas (5A), (6A). Thus, the width of the first electrode E1 of the compensation sub-pixel 141A closest to the first end Ed1A of the sub-pixel column SC1A is different from the width of the first electrode E1 of the compensation sub-pixel 141B closest to the first end Ed1B of the sub-pixel column SC1B, so that the transmittance of the compensation sub-pixel 141A is different from the transmittance of the compensation sub-pixel 141B. For example, the width of the first electrode E1 of the compensation sub-pixel 141A is greater than the width of the first electrode E1 of the compensation sub-pixel 141B. It should be noted that the formulas (5A)-(6C) are as examples, but not limited thereto. According to the present invention, the formula of the width of the first electrode E1 of the compensation sub-pixel can be adjusted, and the calculated result of the adjusted formula also shows that in the sub-pixel column, the width of the first electrode E1 of the compensation sub-pixel is less than the width of the first electrode E1 of the inner sub-pixel, so that the transmittance(s) of the compensation sub-pixel(s) between the first end and the inner sub-pixels of the sub-pixel column is or are less than the transmittance of the inner sub-pixel of the sub-pixel column. In addition, in the embodiment that a plurality of compensation sub-pixels are disposed between the inner sub-pixel and the first end of the sub-pixel column, the calculated result of the adjusted formula also shows the widths of the first electrodes E1 of the compensation sub-pixels are decreased sequentially along the direction from the inner sub-pixel to the first end of the sub-pixel column, so that the transmittances of the plurality of compensation sub-pixels are decreased sequentially along the direction from the inner sub-pixel toward the first end of the sub-pixel column, so as to reduce the zigzag appearance at the edge of the non-rectangular display region AA of the display panel 10.

Figure 10:
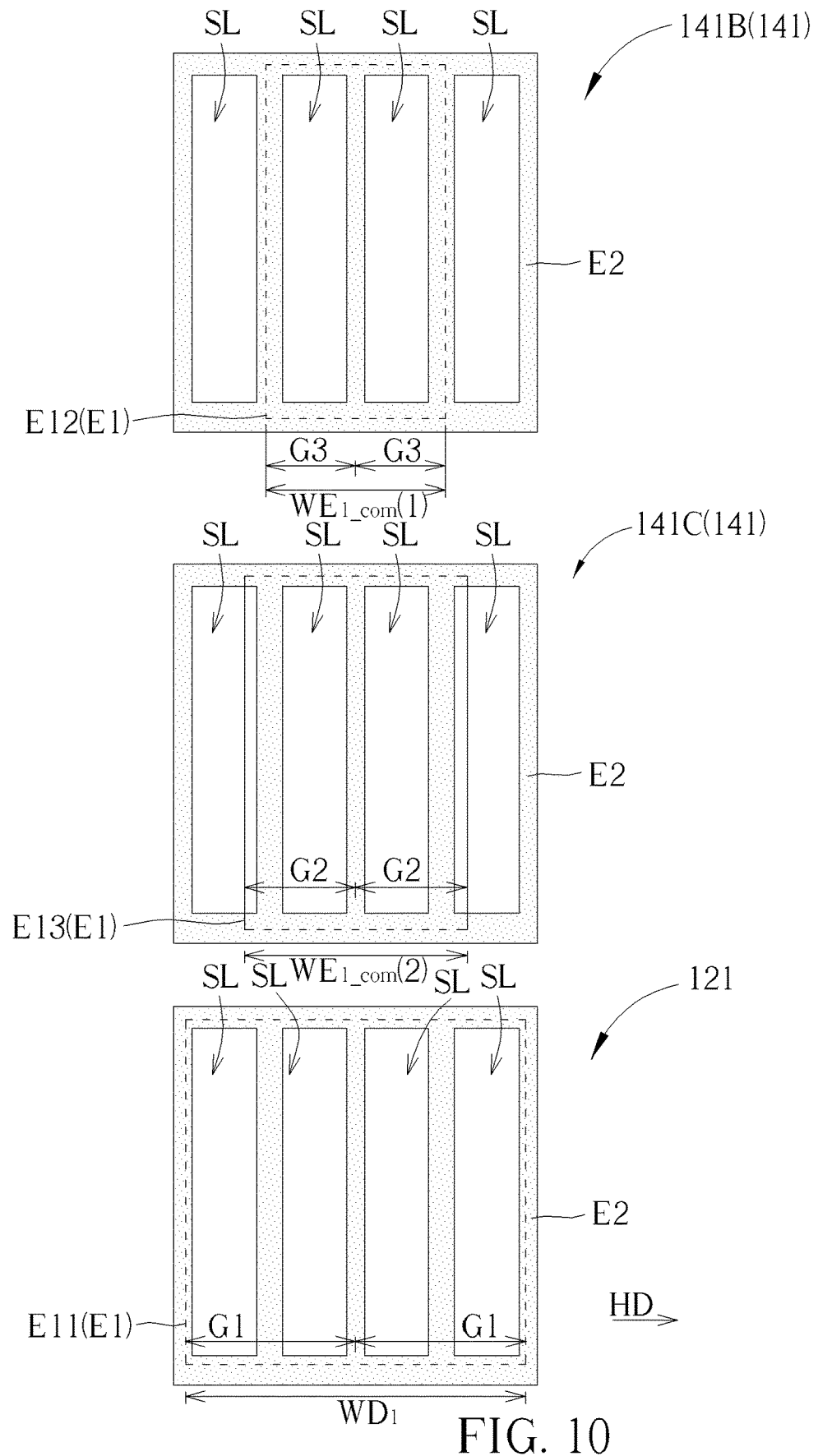
FIG. 10 schematically illustrates a top view of the first electrodes and the second electrodes of the inner sub-pixel and the compensation sub-pixels corresponding to the sub-pixel column SC1B in FIG. 4 according to the second embodiment of the present invention.

In this embodiment, the structures of the second electrodes E2 of the inner sub-pixels 121, 122, 123 may be the same as the structures of the electrodes E2 of the compensation sub-pixel 141, 142, 143, respectively, but not limited thereto. For example, the widths of the slits and the widths of the strip portions of the second electrodes E2 of the inner sub-pixels 121, 122, 123 may be the same as the widths of the slits and the widths of the strip portions of the second electrodes E2 of the compensation sub-pixels 141, 142, 143, respectively, but not limited thereto. In a variant embodiment, the widths of the first electrodes E1 of the inner sub-pixels 121, 122, 123 are different from the widths of the first electrodes E1 of the compensation sub-pixels 141, 142, 143, respectively, and the structures of the second electrodes E2 of the inner sub-pixels 121, 122, 123 may also be different from the structures of the second electrodes E2 of the compensation sub-pixels 141, 142, 143, respectively. For example, in the variant embodiment, the first embodiment may be applied to set the widths of the slits and the widths of the strip portions of the second electrodes E2 of the compensation sub-pixels 141, 142, 143, and the second embodiment may be applied to set the widths of the first electrodes E1 of the compensation sub-pixels 141, 142, 143, but not limited thereto. Please refer to FIG. 10 and FIG. 4. FIG. 10 schematically illustrates a top view of the first electrodes and the second electrodes of the inner sub-pixel and the compensation sub-pixels according to the second embodiment of the present invention, in which the inner sub-pixel and the compensation sub-pixels are respectively exemplified by the inner sub-pixel 121 and the compensation sub-pixels 141B and 141C of the sub-pixel column SC1B in FIG. 4, but not limited thereto. As shown in FIG. 10, in this embodiment, the area of the first electrode E11 of the inner sub-pixel 121 is greater than the area of the first electrode E13 of the compensation sub-pixel 141C, and the area of the first electrode E13 of the compensation sub-pixel 141C is greater than the area of the first electrode E12 of the compensation sub-pixel 141B. Specifically, the width $WD_1$ of the first electrode E11 of the inner sub-pixel 121 in the horizontal direction HD may be greater than the width $WE_{1\_com}(2)$ of the first electrode E13 of the compensation sub-pixel 141C in the horizontal direction HD, and the width $WE_{1\_com}(2)$ of the first electrode E13 of the compensation sub-pixel 141C in the horizontal direction HD may be greater than the width $WE_{1\_com}(1)$ of the first electrode E12 of the compensation sub-pixel 141B in the horizontal direction HD. By means of sequentially decreasing the area of the first electrode E13 of the compensation sub-pixel 141C and the area of the first electrode E12 of the compensation sub-pixel 141B, the transmittance of the inner sub-pixel 121, the transmittance of the compensation sub-pixel 141C and the transmittance of the compensation sub-pixel 141B are sequentially decreased, thereby reducing the brightness of the light generated from the compensation sub-pixels 141. Accordingly, the zigzag appearance at the edge of the non-rectangular panel is mitigated, and the display quality of the display panel is further improved. In this embodiment, the distances from the central line of the first electrode E1 to two sides may be reduced to decrease the width of the first electrode E1 of the compensation sub-pixel in the horizontal direction HD, thereby decreasing the area of the first electrode E1 of the compensation sub-pixel, but not limited thereto. For example, the width $WD_1$ of the first electrode E11 may be the sum of the distances G1 from the central line to two sides of the first electrode E11, the width $WE_{1\_com}(2)$ of the first electrode E13 may be the sum of the distances G2 from the central line (e.g. the central line parallel to the slit SL) to two sides of the first electrode E13, and the width $WE_{1\_com}(1)$ of the first electrode E12 may be the sum of the distances G3 from the central line to two sides of the first electrode E12, in which the distance G1 is greater than the distance G2, and the distance G2 is greater than the distance G3, but not limited thereto.

Figure 11:
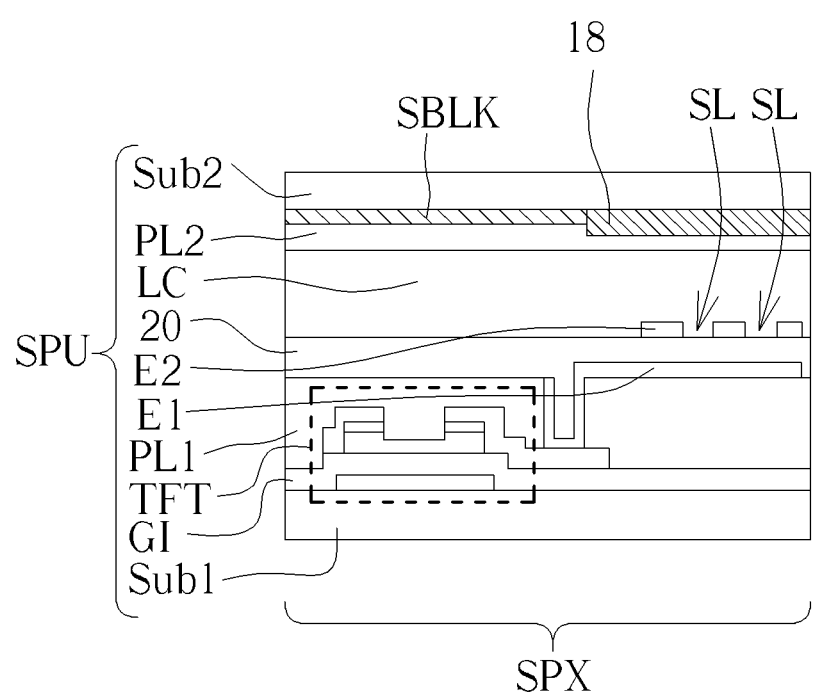
FIG. 11 schematically illustrates a cross-sectional view of the sub-pixel according to a variant embodiment of the first embodiment and the second embodiment of the present invention.

Please refer to FIG. 11, which schematically illustrates a cross-sectional view of the sub-pixel according to a variant embodiment of the first embodiment and the second embodiment of the present invention. In this variant embodiment, the first electrode E1 may be the pixel electrode electrically connected to the thin film transistor TFT, and the second electrode E2 may be the common electrode with the slit SL. In some embodiments, the slits SL of the same second electrode E2 may be the same as each other. In some embodiments, as shown in FIG. 8, the width of each slit SL of the second electrode E21 of the inner sub-pixel 121 serving as the common electrode may be greater than the width of each slit SL of the second electrode E23 of the compensation sub-pixel 141C serving as the common electrode, and the width of each slit SL of the second electrode E23 of the compensation sub-pixel 141C serving as the common electrode may be greater than the width of each slit SL of the second electrode E22 of the compensation sub-pixel 141B serving as the common electrode. In some embodiments, as shown in FIG. 10, the width of the first electrode E13 of the compensation sub-pixel 141C serving as the pixel electrode may be for example less than the width of the first electrode E11 of the inner sub-pixel 121 serving as the pixel electrode, and the width of the first electrode E12 of the compensation sub-pixel 141B serving as the pixel electrode may be for example less than the width of the first electrode E13 of the compensation sub-pixel 141C serving as the pixel electrode. Accordingly, the pixels with unexpected colors can be prevented from seeing by the user, thereby mitigating the zigzag appearance at the edge of the non-rectangular panel and further improving the display quality of the display panel. In some embodiments, the adjusting method of the transmittance difference mentioned above may be applied to the compensation sub-pixels 142, 143 of the sub-pixel columns SC2, SC3.

In summary, in the display panel of the present invention, by means of the difference in the areas of the first electrodes, the difference in the widths of the slits, the difference in the areas of the pixel electrode of the sub-pixel units, the transmittances of the compensation sub-pixel units in different sub-pixel columns closest to the corresponding end may be adjusted to be different from each other, or the transmittances of the inner sub-pixel unit and the compensation sub-pixel unit in the same sub-pixel column may be sequentially reduced along the direction from the inner sub-pixel to the compensation sub-pixel. Accordingly, the brightness of light generated by the sub-pixel corresponding to the compensation sub-pixel unit may be weakened, thereby mitigating the zigzag appearance at the edge of the non-rectangular panel, and the display quality of the display panel may be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display panel, comprising:
    a first sub-pixel column, comprising:
        at least one first inner sub-pixel disposed in a display region of the display panel, wherein a shape of the display region is non-rectangular; and
        a plurality of first compensation sub-pixels disposed between an end of the first sub-pixel column and the first inner sub-pixel;
    wherein each of the first inner sub-pixel and the first compensation sub-pixels comprises a sub-pixel unit, a light shielding sub-block and a color filter block, structures of the sub-pixel units of the first compensation sub-pixels are different from a structure of the sub-pixel unit of the first inner sub-pixel, and the structures of the sub-pixel units of the first compensation sub-pixels are different from each other,
    wherein the first compensation sub-pixels comprises $1^{st}$ to $P^{th}$ first compensation sub-pixels, P is a positive integer greater than or equal to 2, each of the sub-pixel unit of the first inner sub-pixel and the sub-pixel units of the $1^{st}$ to $P^{th}$ first compensation sub-pixels comprises a first electrode, a liquid crystal layer and a second electrode, one of the first electrode and the second electrode is a pixel electrode, the other of the first electrode and the second electrode is a common electrode, the second electrode is disposed between the liquid crystal layer and the first electrode, and the second electrode has at least one slit, and
    wherein a distance between an $i^{th}$ first compensation sub-pixel and the end of the first sub-pixel column is less than a distance between an $(i+1)^{th}$ first compensation sub-pixel and the end of the first sub-pixel column, and i is a positive integer greater than or equal to 1 and smaller than or equal to (P−1), a transmittance of the $(i+1)^{th}$ first compensation sub-pixel is greater than a transmittance of the $i^{th}$ first compensation sub-pixel, and a width of a shortest side of the slit of the $(i+1)^{th}$ first compensation sub-pixel is greater than a width of a shortest side of the slit of the $i^{th}$ first compensation sub-pixel.

2. The display panel according to claim 1, wherein at least one of the first compensation sub-pixels crosses an edge of the display region.

3. The display panel according to claim 1, wherein transmittances of the first compensation sub-pixels are sequentially decreased along a direction from the first inner sub-pixel to the end of the first sub-pixel column.

4. The display panel according to claim 1, wherein the first electrode is the pixel electrode, and a width of the pixel electrode of the $(i+1)^{th}$ first compensation sub-pixel is greater than a width of the pixel electrode of the $i^{th}$ first compensation sub-pixel.

5. The display panel according to claim 1, wherein the first electrode is the common electrode, and a width of the common electrode of the $(i+1)^{th}$ first compensation sub-pixel is greater than a width of the common electrode of the $i^{th}$ first compensation sub-pixel.

6. The display panel according to claim 1, wherein the display panel further comprises a second sub-pixel column, the first sub-pixel column and the second sub-pixel column are for displaying a same color, the second sub-pixel column comprises at least one second inner sub-pixel disposed in the display region and a second compensation sub-pixel disposed between an end of the second sub-pixel column and the second inner sub-pixel, each of the second inner sub-pixel and the second compensation sub-pixel comprises a sub-pixel unit, a light shielding sub-block and a color filter block, a structure of the sub-pixel unit of the second compensation sub-pixel is different from a structure of the sub-pixel unit of the second inner sub-pixel, the first compensation sub-pixels comprise a first outermost compensation sub-pixel located closest to the end of the first sub-pixel column, and the structure of the sub-pixel unit of the second compensation sub-pixel is different from a structure of the sub-pixel unit of the first outermost compensation sub-pixel.

7. The display panel according to claim 6, wherein a transmittance of the first outermost compensation sub-pixel is different from a transmittance of the second compensation sub-pixel.

8. The display panel according to claim 1, wherein the display panel further comprises a second sub-pixel column, the second sub-pixel column is adjacent to the first sub-pixel column, the first sub-pixel column is for displaying a first color, the second sub-pixel column is for displaying a second color, and the first color is different from the second color, wherein the second sub-pixel column comprises at least one second inner sub-pixel disposed in the display region and a plurality of second compensation sub-pixels disposed between an end of the second sub-pixel column and the second inner sub-pixel, and a number of the first compensation sub-pixels is the same as a number of the second compensation sub-pixels.

9. The display panel according to claim 8, wherein transmittances of the second compensation sub-pixels are sequentially decreased along a direction from the second inner sub-pixel to the end of the second sub-pixel column.

10. The display panel according to claim 8, wherein the display panel further comprises a third sub-pixel column, the third sub-pixel column is adjacent to the first sub-pixel column or the second sub-pixel column, the third sub-pixel column is for displaying a third color, and the third color is different from the first color and the second color, wherein the third sub-pixel column comprises at least one third inner sub-pixel disposed in the display region and a plurality of third compensation sub-pixels disposed between an end of the third sub-pixel column and the third inner sub-pixel, and a number of the third compensation sub-pixels is the same as the number of the first compensation sub-pixels and the number of the second compensation sub-pixels.

11. The display panel according to claim 10, wherein transmittances of the third compensation sub-pixels are sequentially decreased along a direction from the third inner sub-pixel to the end of the third sub-pixel column.

12. The display panel according to claim 10, wherein the first color, the second color and the third color are green, red and blue, respectively.

* * * * *